US010728061B2

(12) United States Patent
Lee et al.

(10) Patent No.: US 10,728,061 B2
(45) Date of Patent: Jul. 28, 2020

(54) ELECTRONIC DEVICES INCLUDING EQUALIZERS OPERATING BASED ON COEFFICIENTS ADJUSTED IN TRAINING OPERATIONS

(71) Applicant: Samsung Electronics Co., Ltd., Suwon-si, Gyeonggi-do (KR)

(72) Inventors: June-Hee Lee, Seongnam-si (KR); Byungwook Cho, Hwaseong-si (KR); Bongkyu Kim, Seoul (KR); Gun-Il Kang, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/253,589

(22) Filed: Jan. 22, 2019

(65) Prior Publication Data
US 2019/0386859 A1    Dec. 19, 2019

(30) Foreign Application Priority Data

Jun. 18, 2018    (KR) .......................... 10-2018-0069766

(51) Int. Cl.
*H04L 25/03*    (2006.01)
(52) U.S. Cl.
CPC .. *H04L 25/03885* (2013.01); *H04L 25/03038* (2013.01)
(58) Field of Classification Search
CPC ................... H04L 25/03885; H04L 25/03038
USPC ........................................................ 375/232
See application file for complete search history.

(56) References Cited

U.S. PATENT DOCUMENTS

| 6,961,373 B2 | 11/2005 | Jones |
| 7,450,636 B2 | 11/2008 | Lee et al. |
| 7,822,111 B2 * | 10/2010 | Sohn ................. H04L 25/03038 375/231 |
| 7,949,041 B2 | 5/2011 | Zerbe et al. |
| 8,711,916 B2 | 4/2014 | Zhu |
| 9,014,318 B2 | 4/2015 | Hollis |
| 9,025,655 B1 | 5/2015 | Ramadoss et al. |
| 9,912,500 B2 | 3/2018 | Yu et al. |

(Continued)

FOREIGN PATENT DOCUMENTS

JP    2010-193266    9/2010

*Primary Examiner* — Juan A Torres
(74) *Attorney, Agent, or Firm* — Harness, Dickey & Pierce, P.L.C.

(57) ABSTRACT

An electronic device includes a reception equalizer that performs, a first equalization on a first signal based on a first coefficient, and one or more second equalizations on one or more second signals based on the first coefficient, the one or more second signals being based on a second coefficient associated with one or more characteristics of a transmission equalizer of the external device, and circuitry that iteratively sends control information generated based on the first coefficient to the external device until a termination condition is satisfied with regard to the first coefficient, the control information causing the second coefficient to be increased or decreased, the iteratively sent control information causing a first absolute value of the first coefficient corresponding to a final equalization of the one or more second equalizations to become smaller than a second absolute value of the first coefficient corresponding to the first equalization.

20 Claims, 14 Drawing Sheets

(56) References Cited

U.S. PATENT DOCUMENTS

2010/0158515 A1* 6/2010 Watanabe ......... H04L 25/03012
398/25
2017/0126440 A1* 5/2017 Zerbe ................ H04L 25/03038

* cited by examiner

FIG. 11

| | Select | Adjust | Result | Next iteration |
|---|---|---|---|---|
| Case 1 | $r_1$ | Increasing $t_1$ | $\|r_1\|$ has increased | Decreasing $t_1$ |
| Case 2 | $r_1$ | Decreasing $t_1$ | $\|r_1\|$ has increased | Increasing $t_1$ |
| Case 3 | $r_1$ | Increasing $t_1$ | $\|r_1\|$ has decreased but is not small enough | Further increasing $t_1$ |
| Case 4 | $r_1$ | Decreasing $t_1$ | $\|r_1\|$ has decreased but is not small enough | Further decreasing $t_1$ |
| Case 5 | $r_1$ | Increasing or decreasing $t_1$ | $\|r_1\|$ has decreased and is small enough | Iterations for $r_1$ are done ($r_1$ is acceptable) | under 35 U.S.C. § 119 to Korean Patent Application
ELECTRONIC DEVICES INCLUDING EQUALIZERS OPERATING BASED ON COEFFICIENTS ADJUSTED IN TRAINING OPERATIONS

CROSS-REFERENCE TO RELATED APPLICATION

This U.S. non-provisional patent application claims priority under 35 U.S.C. § 119 to Korean Patent Application No. 10-2018-0069766, filed on Jun. 18, 2018, in the Korean Intellectual Property Office, the disclosure of which is incorporated herein by reference in its entirety.

TECHNICAL FIELD

Some example embodiments relate to electronic devices, and more particularly, relates to configurations and operations associated with equalizers for reducing inter-symbol interference.

BACKGROUND

An electronic device may perform functions depending on operations of various electronic circuits included in the electronic device. The electronic device may operate either alone or while communicating with another electronic device.

As an amount of data exchanged between electronic devices increases, communication circuits capable of transmitting and receiving signals at high speed are being employed. The electronic devices are connected to each other through a communication channel, and the communication channel transfers signals transmitted and received between the electronic devices.

SUMMARY

Example embodiments may provide an electronic device including an equalizer for reducing inter-symbol interference between signals transferred at high speed. In some example embodiments, coefficients of a receiver-side equalizer may be used to perform a training operation on coefficients of a transmitter-side equalizer. In some example embodiments, the coefficients of the transmitter-side equalizer may be iteratively adjusted such that an absolute value of each of the coefficients of the receiver-side equalizer is minimized or reduced.

In some example embodiments, an electronic device may include a reception equalizer. The reception equalizer may be configured to perform, a first equalization on a first signal among a plurality of signals received from an external device, the first equalization being based on a first coefficient. The reception equalizer may also be configured to perform one or more second equalizations on one or more second signals among the plurality of signals, the one or more second equalizations being based on the first coefficient, the one or more second signals being received from the external device after the first signal is received, the one or more second signals being based on a second coefficient associated with one or more characteristics of a transmission equalizer of the external device. The electronic device may also include circuitry that may be configured to iteratively send control information generated based on the first coefficient to the external device until a termination condition is satisfied with regard to the first coefficient, the control information causing the second coefficient to be increased or decreased, the iteratively sent control information causing a first absolute value of the first coefficient corresponding to a final equalization of the one or more second equalizations to become smaller than a second absolute value of the first coefficient corresponding to the first equalization.

In some example embodiments, an electronic device may include a reception equalizer. The reception equalizer may be configured to perform an equalization on a plurality of signals received from an external device based on a first coefficient, the plurality of signals includes a first signal and one or more second signals received after the first signal, the first coefficient being adjusted based on the plurality of signals. The electronic device may also include circuitry that may be configured to iteratively generate first control information based on the first coefficient to be transmitted to the external device in response to the plurality signals, the one or more second signals being based on the first control information, the iteratively generated first control information causing a final absolute value of the first coefficient to decrease with respect to an initial absolute value of the first coefficient.

In some example embodiments, an electronic device may include a transmission equalizer. The transmission equalizer may be configured to perform a pre-equalization on one or more first signals based on a first coefficient to generate one or more second signals. The electronic device may also be include a reception equalizer that may be configured to perform an equalization on the one or more second signals based on a second coefficient, the second coefficient being adjusted based on the one or more second signals received through a communication channel. The electronic device may also include first circuitry that may be configured to iteratively perform, generating control information based on the second coefficient, and sending the control information to the transmission equalizer, the control information causing the first coefficient to be increased or decreased, wherein, following a final iteration, a final absolute value of the second coefficient is decreased with respect to an initial absolute value of the second coefficient.

In some example embodiments, an electronic device may include a reception equalizer. The reception equalizer may be configured to perform an equalization on one or more first signals received from an external device to generate one or more second signals. The electronic device may also include circuitry that may be configured to iteratively generate control information to be sent to the external device until a termination condition is satisfied, the control information being based on one or more characteristics of the reception equalizer which vary based on the one or more first signals, one or more characteristics of the one or more first signals changing based on the sent control information, the control information sent following a final iteration of the iterative generation causes the one or more characteristics of the one or more first signals to become more similar to one or more characteristics of the one or more second signals.

In some example embodiments, a method performed by circuitry for communication with an external device. the method may include calculating a first value of a first coefficient after the first coefficient is adjusted based on a first signal received from an external device, the first coefficient being associated with an equalization operation, sending control information to the external device, the control information being associated with the adjusted first coefficient, receiving a second signal from the external device based on the control information, calculating a second value of the first coefficient after the first coefficient is adjusted based on the second signal, and repeating the sending the control information, the receiving the second signal, and the calculating the second value until the first coefficient satisfies a termination condition, an absolute value of the second value being smaller than an absolute value of the first value after the repeating.

According to some example embodiments, a training operation for a transmitter-side equalizer may be completed within a short time. Further, performance of the transmitter-side equalizer may be enhanced, and thus equalization performance of the entire system may be improved.

BRIEF DESCRIPTION OF THE DRAWINGS

Some example embodiments will be more clearly understood from the following descriptions in conjunction with the accompanying drawings. The accompanying drawings represent non-limiting, example embodiments as described herein.

FIG. 11 is a table illustrating an example training operation of FIGS. 9 and 10.

DETAILED DESCRIPTION

Below, some example embodiments will be described in detail and clearly with reference to the accompanying drawings such that those skilled in the art can easily implement the example embodiments.

Figure 1:
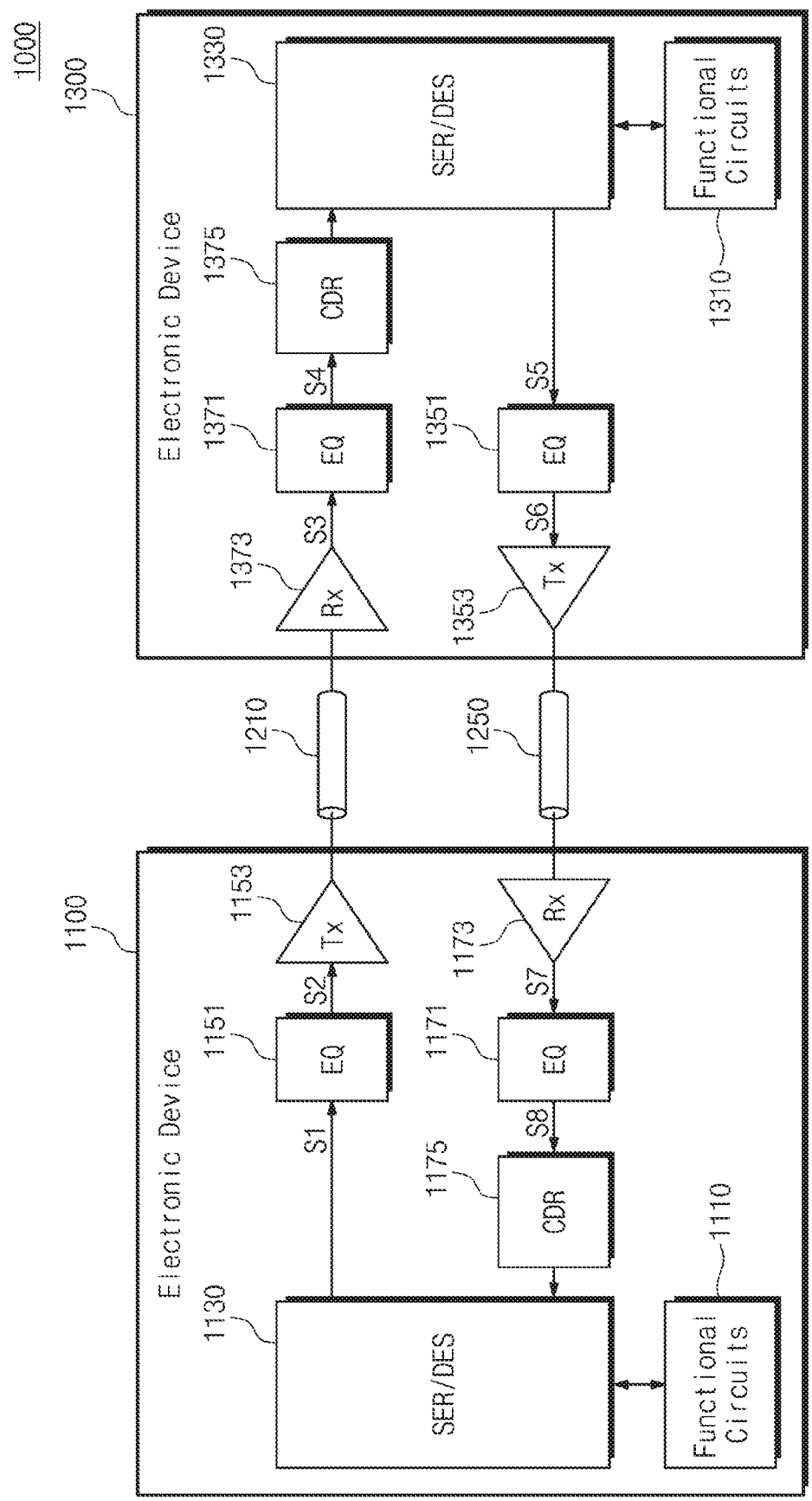
FIG. 1 is a block diagram illustrating an example configuration of an electronic system which includes equalizers according to some example embodiments.

FIG. 1 is a block diagram illustrating an example configuration of an electronic system 1000 which includes equalizers according to some example embodiments.

The electronic system 1000 may include electronic devices 1100 and 1300. In some example embodiments, each of the electronic devices 1100 and 1300 may be implemented as one of various electronic devices such as a desktop computer, a laptop computer, a tablet computer, a smart phone, a wearable device, a video game console, a home appliance, a medical device, and/or the like.

However, some example embodiments are not limited thereto, and the electronic system 1000 may be implemented as a single electronic device in some example embodiments. In such example embodiments, each of the electronic devices 1100 and 1300 may be a component or an intellectual property (IP), which is included in the single electronic device, and may be implemented as a circuit-, a module-, a chip-, and/or a package-level entity. The terms "system" and "device" are provided to facilitate better understanding, and are not intended to limit some example embodiments.

The electronic devices 1100 and 1300 may exchange data/signals through communication channels 1210 and 1250 while communicating with each other. Each of the communication channels 1210 and 1250 may include a conductive material to transfer the data/signals. For example, each of the communication channels 1210 and 1250 may be implemented as a trace pattern on a printed circuit board (PCB), a wire, a cable, a metal pin/pad of a connector, and/or the like.

The electronic device 1100 may include functional circuits 1110, a serializer/deserializer (SER/DES) 1130, an equalizer (EQ) 1151, a transmitter (Tx) 1153, a receiver (Rx) 1173, an equalizer (EQ) 1171, and a clock and data recovery (CDR) circuit 1175. The electronic device 1300 may include functional circuits 1310, a SER/DES 1330, an equalizer (EQ) 1351, a transmitter (Tx) 1353, a receiver (Rx) 1373, an equalizer (EQ) 1371, and a CDR circuit 1375. According to some example embodiments, any or all of the functional circuits 1110, the SER/DES 1130, the equalizer 1151, the transmitter 1153, the receiver 1173, the equalizer 1171, the CDR circuit 1175, the functional circuits 1310, the SER/DES 1330, the equalizer 1351, the transmitter 1353, the receiver 1373, the equalizer 1371, and/or the CDR circuit 1375 may be implemented using circuits or circuitry (e.g., an analog and/or digital circuit) and/or at least one processor executing firmware. Operations described herein as being performed by any or all of the electronic device 1100, the electronic device 1300, the functional circuits 1110, the SER/DES 1130, the equalizer 1151, the transmitter 1153, the receiver 1173, the equalizer 1171, the CDR circuit 1175, the functional circuits 1310, the SER/DES 1330, the equalizer 1351, the transmitter 1353, the receiver 1373, the equalizer 1371, and/or the CDR circuit 1375 may be performed by at least one processor executing program code that includes instructions corresponding to the operations. The instructions may be stored in a memory of the respective electronic device (e.g., the electronic device 1100 or the electronic device 1300). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor, a multiprocessor, an application-specific integrated circuit (ASIC), and a field programmable gate array (FPGA).

The functional circuits 1110 and 1310 may be configured to perform functions of the electronic devices 1100 and 1300, respectively. For example, the functional circuits 1110 and 1310 may constitute various components or IPs, such as at least one processor (e.g., a central processing unit (CPU), an application processor (AP), and/or the like), a memory, an image sensor, a display device, and/or the like.

The electronic devices 1100 and 1300 may be implemented as separate components, IPs, or devices. For example, the electronic device 1100 may be an external device to the electronic device 1300, and the electronic device 1300 may be an external device to the electronic device 1100.

The SER/DES 1130 may be configured to serialize data generated depending on operations of the functional circuits 1110. The SER/DES 1130 may provide the serialized data to the equalizer 1151 via a signal S1. The equalizer 1151 may perform a pre-equalization on the signal S1 to generate a signal S2. The transmitter 1153 may transmit the signal S2 to the electronic device 1300 through the communication channel 1210.

The receiver 1373 may provide a signal S3 to the equalizer 1371, based on a signal received through the communication channel 1210. The equalizer 1371 may perform an equalization on the signal S3 to generate a signal S4. The CDR circuit 1375 may recover a clock and data from the signal S4. The CDR circuit 1375 may provide the recovered data to the SER/DES 1330 based on the recovered clock.

The SER/DES 1330 may deserialize the provided data. The deserialized data may correspond to data which has been generated from the functional circuits 1110. The SER/DES 1330 may provide the deserialized data to the functional circuits 1310. The functional circuits 1310 may operate based on the provided data.

Likewise, the SER/DES 1330 may serialize data generated depending on operations of the functional circuits 1310, and thus may provide a signal S5 to the equalizer 1351. The equalizer 1351 may perform a pre-equalization on the signal S5 to generate a signal S6. The transmitter 1353 may transmit the signal S6 to the electronic device 1100 through the communication channel 1250.

The receiver 1173 may provide a signal S7 to the equalizer 1171 based on a signal received through the communication channel 1250. The equalizer 1171 may perform an equalization on the signal S7 to generate a signal S8. The CDR circuit 1175 may recover a clock and data from the signal S8. The CDR circuit 1175 may provide the recovered data to the SER/DES 1130 based on the recovered clock.

The SER/DES 1130 may deserialize the provided data. The deserialized data may correspond to data which has been generated from the functional circuits 1310. The SER/DES 1130 may provide the deserialized data to the functional circuits 1110. The functional circuits 1110 may operate based on the provided data.

In such a manner, the electronic devices 1100 and 1300 may exchange data/signals with each other through the communication channels 1210 and 1250. When a speed of communication between the electronic devices 1100 and 1300 is increased (e.g., when the communication is performed at a higher frequency or a larger bandwidth), the electronic devices 1100 and 1300 may exchange a larger amount of data relative to time.

However, due to various causes such as skin effect, dielectric loss, and the like, each of the communication channels 1210 and 1250 may exhibit a low-pass frequency response characteristic. Thus, in a high-speed operation, bandwidths of the communication channels 1210 and 1250 may be limited and may become smaller than a bandwidth of the signals. This may weaken high frequency components of the signals transferred through the communication channels 1210 and 1250, and may cause inter-symbol interference on a time domain. As a result, as a speed for transferring the signals gets faster, the distortion of the signals may become more severe and quality of the signals may become degraded.

To compensate the unintended distortion of the signals, the equalizers 1371 and 1171 may perform an equalization on the signals, and the equalizers 1151 and 1351 may perform a pre-equalization on the signals. The signal distortion, the equalization, and the pre-equalization will be described with reference to FIGS. 2 to 7.

The equalizers 1171 and 1371 may be provided corresponding to the receivers 1173 and 1373, respectively. The equalizers 1151 and 1351 may be provided corresponding to the transmitters 1153 and 1353, respectively. In the present disclosure, each of the equalizers 1171 and 1371 may also be referred to as a reception equalizer, and each of the equalizers 1151 and 1351 may also be referred to as a transmission equalizer.

Figure 2:
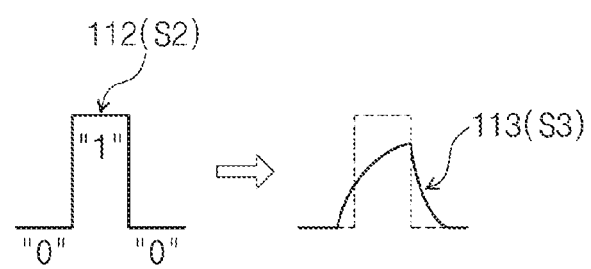
FIGS. 2 and 3 are conceptual diagrams illustrating example distortions of signals transferred through a communication channel of FIG. 1.
Figure 3:
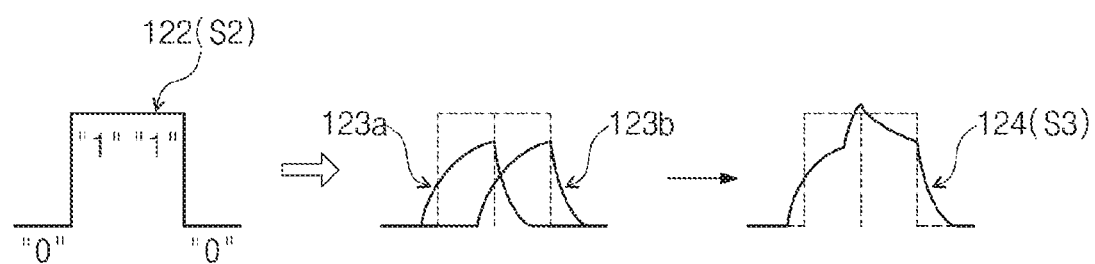

FIGS. 2 and 3 are conceptual diagrams illustrating example distortion of signals transferred through the communication channel 1210 of FIG. 1. It may be readily understood that signals transferred through the communication channel 1250 may also be distorted in similar flows to those described below. According to the examples discussed in association with FIGS. 2-3, no equalization is performed by any of the equalizers 1151, 1171, 1351 and/or 1371.

To facilitate better understanding, it will be assumed in the following descriptions that the electronic system 1000 deals with signals of a non-return-to-zero (NRZ) coding. However, it may be readily understood that some example embodiments may be changed or modified to deal with signals of another type (e.g., four-level pulse amplitude modulation (PAM-4), PAM-8, PAM-16, or the like).

Referring to FIG. 2, for example, the signal S2 may have a waveform 112. With regard to the signal waveforms discussed herein, the horizontal direction may be associated with time, and the vertical direction may be associated with signal level (e.g., a voltage level).

The waveform 112 may mean that the signal S2 is generated to have signal levels corresponding to the logic "0", the logic "1", and the logic "0" sequentially. When the signal S2 of the waveform 112 is transmitted by the transmitter 1153 to the electronic device 1300 through the communication channel 1210, the signal S2 may be distorted due to characteristics of the communication channel 1210 (the terms "characteristic" and/or "characteristics" as used herein may refer to the singular and/or plural). For example, the signal S3 which is received in the electronic device 1300 and then is output from the receiver 1373 may have a waveform 113 which is different from the waveform 112.

Referring to FIG. 3, for example, the signal S2 may have a waveform 122. The waveform 122 may mean that the signal S2 is generated to have signal levels corresponding to the logic "0", the logic "1", the logic "1", and the logic "0" sequentially. When the signal S2 of the waveform 122 is transmitted by the transmitter 1153 to the electronic device 1300 through the communication channel 1210, symbols corresponding to the logic "1" may be received as waveforms 123*a* and 123*b* due to the characteristics of the communication channel 1210.

The waveforms 123*a* and 123*b* may affect each other on the time domain (e.g., an inter-symbol interference) and the signal S2 may be distorted. For example, the signal S3 which is received in the electronic device 1300 and output from the receiver 1373 may have a waveform 124 which is different from the waveform 122.

As such, when the signals are transmitted through the communication channel 1210, the waveforms of the signals may be unintentionally distorted. Due to this distortion, in some cases, data exchanged between the electronic devices 1100 and 1300 may be corrupted. In some cases, an error may occur in operations of the electronic devices 1100 and 1300 due to the data corruption, which may result in instability of the electronic system 1000. The equalizers 1151, 1171, 1351, and 1371 may be employed to compensate for (e.g., cancel) the unintended distortion of the signals.

Figure 4:
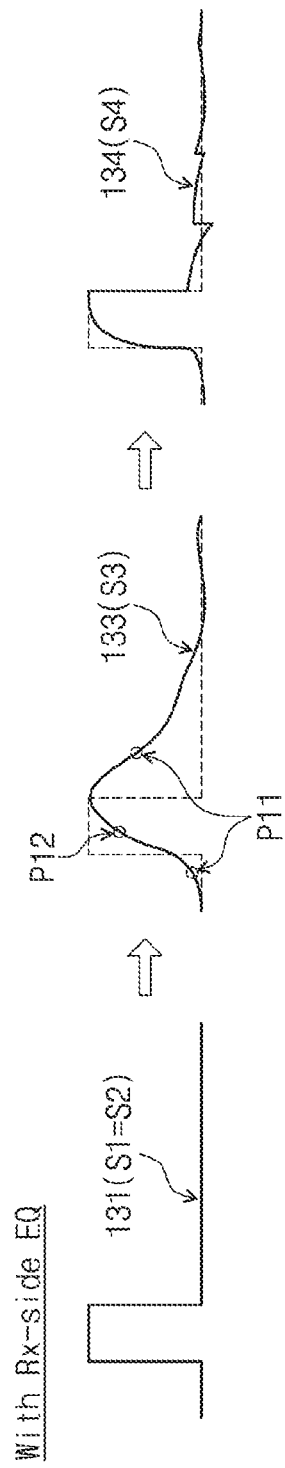
FIG. 4 is a conceptual diagram for describing example operations of a reception equalizer of FIG. 1.

FIG. 4 is a conceptual diagram for describing an example operation of the reception equalizer 1371 of FIG. 1. FIG. 4 is associated with a case where the electronic system 1000 employs only the reception equalizer 1371 without the transmission equalizer 1151. It may be readily understood that the reception equalizer 1171 may operate similarly to the reception equalizer 1371 as described below.

When the transmission equalizer 1151 is not employed, the signal S2 may be the same as or similar to the signal S1. For example, the signal S2 may have a waveform 131. The signal S2 may be distorted while being transferred through the communication channel 1210. The receiver 1373 may output the signal S3, based on a signal received from the communication channel 1210.

For example, the signal S3 may have a waveform 133 which is different from the waveform 131. Comparing the waveform 133 to the waveform 131, due to the characteristics of the communication channel 1210, signal levels P11 (corresponding to the logic "0") may become higher than intended signal levels, and a signal level P12 (corresponding to the logic "1") may become lower than an intended signal level. In other words, the receiver 1373 may provide the equalizer 1371 with the signal S3 of the distorted waveform 133.

The equalizer 1371 may perform an equalization on the signal S3. The equalization may mean an operation which gives the signal S3 an effect opposite to the characteristics of the communication channel 1210 in order to restore the distorted waveform of the signal S3 to an intended waveform (e.g., waveform 131) or a waveform which is similar to the intended waveform. For example, the equalizer 1371 may correspond to a filter of a high-pass frequency response characteristic.

For example, the equalizer 1371 may perform an equalization to generate the signal S4 of a waveform 134. Comparing the waveform 134 to the waveform 133, it may be understood that the signal level which has increased on the signal S3 may be decreased and the signal level which has decreased on the signal S3 may be increased. Thus, comparing the waveform 134 to the waveform 131, the signal S4 may be restored to be similar to the signal S2.

As such, the reception equalizer 1371 may perform an equalization based on a received signal, and may restore a distorted signal. Thus, an inter-symbol interference may be reduced, and a gap between signal levels on an eye diagram may be secured sufficiently. This may improve signal quality, thereby improving communication quality in the electronic system 1000.

Figure 5:
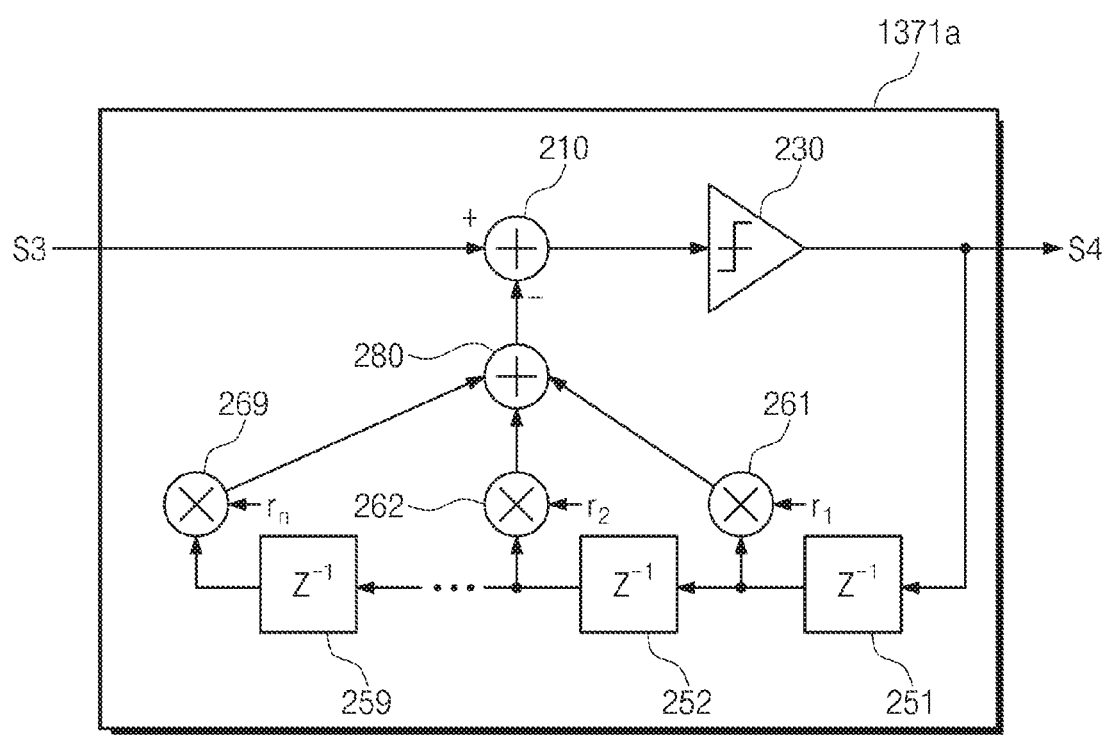
FIG. 5 is a block diagram illustrating an example configuration of a reception equalizer of FIG. 1.

FIG. 5 is a block diagram illustrating an example configuration of the reception equalizer 1371 of FIG. 1. It may be readily understood that the reception equalizer 1171 may be configured similarly to the reception equalizer 1371.

In some example embodiments, the reception equalizer 1371 may include a reception equalizer 1371*a* of FIG. 5. The reception equalizer 1371*a* may include an adder 210, a slicer 230, delay buffers 251, 252, and 259, multipliers 261, 262, and 269, and an adder 280. The reception equalizer 1371*a* may perform an equalization on the signal S3 to generate the signal S4. According to some example embodiments, any or all of the adder 210, the slicer 230, the delay buffers 251, 252, and 259, the multipliers 261, 262, and 269, and/or the adder 280 may be implemented using circuits or circuitry (e.g., an analog and/or digital circuit) and/or at least one processor executing firmware. Operations described herein as being performed by any or all of the adder 210, the slicer 230, the delay buffers 251, 252, and 259, the multipliers 261, 262, and 269, and/or the adder 280 may be performed by at least one processor executing program code that includes instructions corresponding to the operations. The instructions may be stored in a memory of the electronic device (e.g., the electronic device 1300). Although a particular quantity of multipliers and delay buffers are discussed in association with the reception equalizer 1371*a* of FIG. 5, according to some example embodiments, the reception equalizer 1371*a* may include a different quantity of multipliers and/or delay buffers.

The adder 210 may subtract a level of a signal output from the adder 280 from a signal level of the signal S3. The slicer 230 may provide decision for a logic value which corresponds to the output of the adder 210. The output of the slicer 230 may be provided as the signal S4, and may be fed back to the delay buffer 251.

Each of the delay buffers 251, 252, and 259 may delay a timing of transferring a signal. The delay buffer 251 may delay transfer of the output of the slicer 230, and the delay buffers 252 and 259 may delay transfer of an output of a preceding delay buffer. The multipliers 261, 262, and 269 may multiply the outputs of the delay buffers 251, 252, and 259 by coefficients $r_1$, $r_2$, and $r_n$, respectively. The adder 280 may add the outputs of the multipliers 261, 262, and 269.

The coefficients $r_1$, $r_2$, and/or $r_n$ (e.g., reception coefficients) may indicate how much signal levels of the outputs of the respective delay buffers 251, 252, and/or 259 are increased or decreased. A direction where the signal levels are adjusted (e.g., an increase or a decrease) and an amount where the signal levels are adjusted may be determined based on the coefficients $r_1$, $r_2$, and/or $r_n$. Accordingly, the coefficients $r_1$, $r_2$, and/or $r_n$ may be associated with one or more characteristics (e.g., filtering characteristics) of the reception equalizer 1371*a*. The characteristics of the reception equalizer 1371*a* may be described by the following equation 1.

$$H(z)=1+r_1 z^{-1}+r_2 z^{-2}+ \ldots +r_n z^{-n} \qquad \text{[Equation 1]}$$

When the characteristics of the reception equalizer 1371*a* are changed, the characteristics (e.g., a waveform, an eye open status, a signal level, and/or the like) of the signal S4 may also be changed. Thus, the coefficients $r_1$, $r_2$, and/or $r_n$ may also be associated with the characteristics of the signal S4. For example, values of the coefficients $r_1$, $r_2$, and/or $r_n$ may be stored in a memory such as a register, and may be adjustable.

The reception equalizer 1371*a* of FIG. 5 may be understood as a decision feedback equalizer (DFE). However, FIG. 5 illustrates an example configuration of the reception equalizer 1371 to facilitate better understanding, and is not intended to limit the present disclosure. The reception equalizer 1371 may be variously modified or changed to be implemented as one or more of various equalizers such as a feed forward equalizer (FFE), a continuous time linear equalizer (CTLE), and/or the like.

Figure 6:
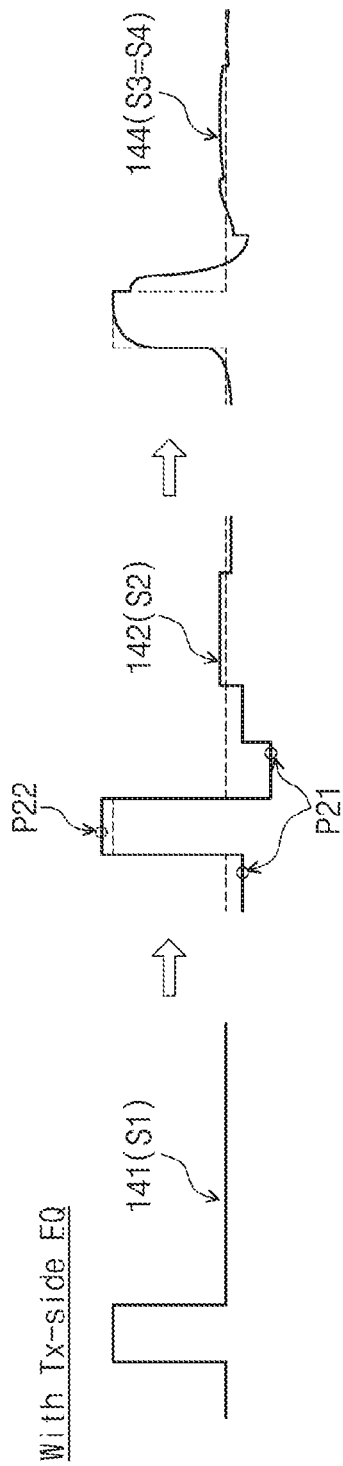
FIG. 6 is a conceptual diagram for describing example operations of a transmission equalizer of FIG. 1.

FIG. 6 is a conceptual diagram for describing an example operation of the transmission equalizer 1151 of FIG. 1. FIG. 6 is associated with a case where the electronic system 1000 employs only the transmission equalizer 1151 without the reception equalizer 1371. It may be readily understood that the transmission equalizer 1351 may operate similarly to the transmission equalizer 1151.

For example, the signal S1 may have a waveform 141. The transmission equalizer 1151 may perform a pre-equalization on the signal S1 to generate the signal S2. The pre-equalization may mean an operation which gives the signal S1 an effect opposite to the characteristics of the communication channel 1210 before the transmitter 1153 transmits the signal S2 to the communication channel 1210, such that a waveform of the signal S2 is changed to an intended waveform (or a waveform which is close to the intended waveform) while the signal S2 is transferred through the communication channel 1210.

For example, the transmission equalizer 1151 may perform a pre-equalization to generate the signal S2 of a waveform 142. Comparing the waveform 142 to the waveform 141, signal levels P21 (corresponding to the logic "0") may become lower than original signal levels, and a signal level P22 (corresponding to the logic "1") may become higher than an original signal level. The transmission equalizer 1151 may pre-distort the signal S1 to generate the signal S2. For example, the transmission equalizer 1151 may correspond to a filter of a high-pass frequency response characteristic.

Comparing the waveform 142 to the waveform 133 of FIG. 4, it may be understood that the signal levels P21 may be decreased whereas the signal levels P11 corresponding to the signal levels P21 may be increased. Furthermore, it may be understood that the signal level P22 may be increased whereas the signal level P12 corresponding to the signal level P22 may be decreased. In terms of a change (e.g., an increase or a decrease) in a signal level, the pre-equalization of the transmission equalizer 1151 may be performed in a direction opposite to that of the equalization of the reception equalizer 1371. For example, the pre-equalization of the transmission equalizer 1151 may provide a reverse operation for the equalization of the reception equalizer 1371.

The waveform of the signal S2 may be changed while the signal S2 is transferred through the communication channel 1210. For example, the receiver 1373 may output the signal S3 of a waveform 144, based on a signal received through the communication channel 1210. When the reception equalizer 1371 is not employed, the signal S4 may be similar to or the same as the signal S3.

Comparing the waveform 144 to the waveform 142, due to the characteristics of the communication channel 1210, the signal levels P21 may have increased to intended signal levels (e.g., the corresponding signal levels of waveform 141) or signal levels which are similar to the intended signal levels, and the signal level P22 may have decreased to an intended signal level (e.g., the corresponding signal levels of waveform 141) or a signal level which is similar to the intended signal level. Accordingly, comparing the waveform 144 to the waveform 141, the signal S3 may be restored to be similar to the signal S1.

As such, the transmission equalizer 1151 may perform a pre-equalization to pre-distort a signal which is to be transmitted. The pre-distorted signal may be changed to an intended signal (or a signal which is similar to the intended signal) as the pre-distorted signal is transferred through the communication channel 1210. Accordingly, the pre-equalization may perform a similar function as that of the equalization.

Figure 7:
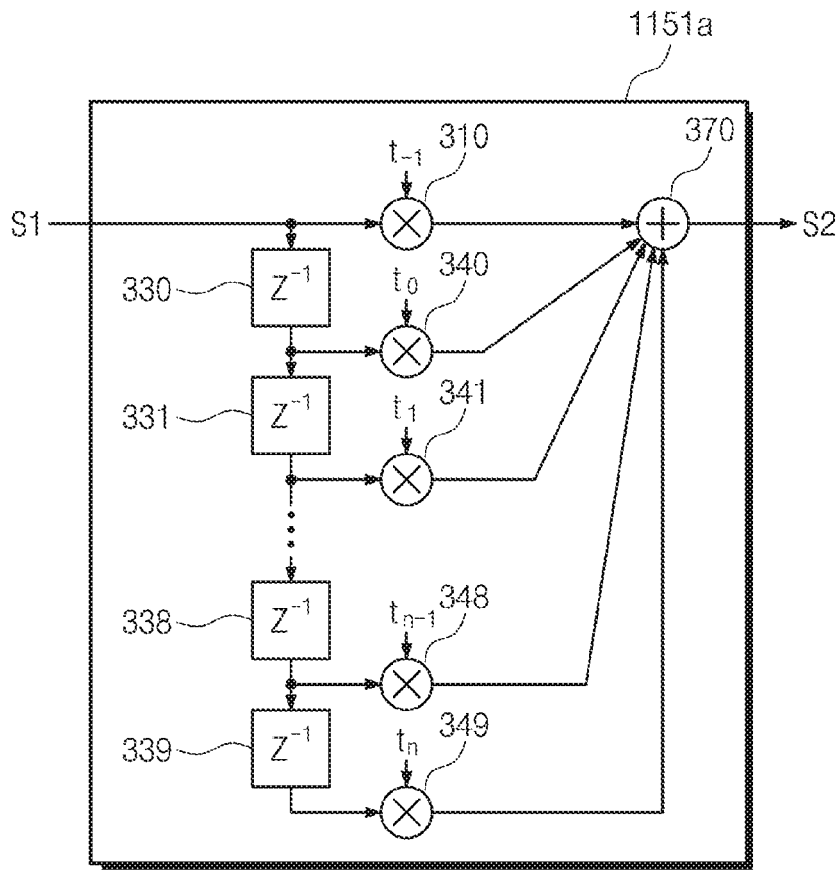
FIG. 7 is a block diagram illustrating an example configuration of a transmission equalizer of FIG. 1.

FIG. 7 is a block diagram illustrating an example configuration of the transmission equalizer 1151 of FIG. 1. It may be understood that the transmission equalizer 1351 may be configured similarly to or the same as the transmission equalizer 1151.

In some example embodiments, the transmission equalizer 1151 may include a transmission equalizer 1151a of FIG. 7. The transmission equalizer 1151a may include a multiplier 310, delay buffers 330, 331, 338, and 339, multipliers 340, 341, 348, and 349, and an adder 370. The transmission equalizer 1151 may perform a pre-equalization on the signal S1 to generate the signal S2. According to some example embodiments, any or all of the multiplier 310, the delay buffers 330, 331, 338, and 339, the multipliers 340, 341, 348, and 349, and/or the adder 370 may be implemented using circuits or circuitry (e.g., an analog and/or digital circuit) and/or at least one processor executing firmware. Operations described herein as being performed by any or all of the multiplier 310, the delay buffers 330, 331, 338, and 339, the multipliers 340, 341, 348, and 349, and/or the adder 370 may be performed by at least one processor executing program code that includes instructions corresponding to the operations. The instructions may be stored in a memory of the electronic device (e.g., the electronic device 1100). Although a particular quantity of multipliers and delay buffers are discussed in association with the transmission equalizer 1151a of FIG. 7, according to some example embodiments, the transmission equalizer 1151a may include a different quantity of multipliers and/or delay buffers.

The multiplier 310 may multiply the signal S1 by a coefficient $t_{-1}$. Each of the delay buffers 330, 331, 338, and 339 may delay a timing of transferring a signal. The delay buffer 330 may delay transfer of the signal S1, and the delay buffers 331, 338, and 339 may delay transfer of an output of a preceding delay buffer. The multipliers 340, 341, 348, and 349 may multiply the outputs of the delay buffers 330, 331, 338, and 339 by coefficients $t_0$, $t_1$, $t_{n-1}$, and $t_n$, respectively.

The adder 370 may add outputs of the multipliers 310, 340, 341, 348, and 349. The output of the adder 370 may be provided as the signal S2.

The coefficients $t_{-1}$, $t_0$, $t_1$, $t_{n-1}$, and/or $t_n$ (e.g., transmission coefficients) may indicate how much signal levels of the signal S1 and the outputs of the respective delay buffers 330, 331, 338, and/or 339 are increased or decreased. A direction in which the signal levels are adjusted (e.g., an increase or a decrease) and an amount in which the signal levels are adjusted may be determined based on the coefficients $t_{-1}$, $t_0$, $t_1$, $t_{n-1}$, and/or $t_n$. Thus, the coefficients $t_{-1}$, $t_0$, $t_1$, $t_{n-1}$, and/or $t_n$ may be associated with one or more characteristics (e.g., filtering characteristics) of the transmission equalizer 1151a. The characteristics of the transmission equalizer 1151a may be described by the following equation 2.

$$H(z)=t_{-1}+t_0 z^{-1}+t_1 z^{-2}+\ldots+t_{n-1}z^{-n}+t_n z^{-(n+1)} \quad \text{[Equation 2]}$$

When the characteristics of the transmission equalizer 1151a are changed, characteristics (e.g., a waveform, an eye open status, a signal level, and/or the like) of the signal S2 are changed, resulting in corresponding changes in characteristics of the signal S3. Thus, the coefficients $t_{-1}$, $t_0$, $t_1$, $t_{n-1}$, and/or $t_n$ may be associated with the characteristics of the signals S2 and S3. For example, values of the coefficients $t_{-1}$, $t_0$, $t_1$, $t_{n-1}$, and/or $t_n$ may be stored in a memory such as a register, and may be adjustable.

The transmission equalizer 1151a of FIG. 7 may be understood as a finite impulse response (FIR) filter. However, FIG. 7 illustrates an example configuration of the transmission equalizer 1151 to facilitate better understanding, and is not intended to limit the present disclosure. The transmission equalizer 1151 may be variously changed or modified to be implemented as another type of equalizer such as an FFE.

Each of the equalizers 1151 and 1371 may adjust one or more characteristics of a target signal, based on delayed signals. The equalizers 1151 and 1371 may operate to attenuate an influence of pre-cursors and/or post-cursors associated with the inter-symbol interference.

The transmission equalizer 1151 may operate based on an original signal (e.g., the signal S1) which is not distorted, and thus may consume less power and may be more easily implemented in comparison to the reception equalizer 1371. However, the transmission equalizer 1151 may operate based on a signal which has not yet been transmitted, and thus may not take into account information associated with the communication channel 1210.

On the other hand, the reception equalizer 1371 may operate based on a signal (e.g., the signal S3) which has been transmitted through the communication channel 1210, and thus may perform an adaptive equalization taking into account the characteristics of the communication channel 1210. However, the reception equalizer 1371 may consume more power in a more complex configuration and may amplify more noise in comparison to the transmission equalizer 1151.

For this reason, the electronic system 1000 may employ both the equalizers 1151 and 1371. In this case, operations of the equalizers 1151 and 1371 may be mutually cooperative, and an advantage of one of the equalizers 1151 and 1371 may compensate for a drawback of the other of the equalizers 1151 and 1371. Thus, when the equalizers 1151 and 1371 operate together, stability in a high-speed communication may be improved.

According to some example embodiments, due to the complex configuration and power consumption of the reception equalizer 1371, it may be advantageous to reduce the role of the reception equalizer 1371 and increase the role of the transmission equalizer 1151. However, such a configuration may result in higher inter-symbol interference then when the equalizers 1151 and 1371 operate together.

Herein, as can be understood from the above descriptions given with reference to FIGS. 4 to 7 and the equations 1 and 2, directions of the operations of the equalizers 1151 and 1371 may be opposite to each other, but operation manners or principles of the equalizers 1151 and 1371 may be identical or similar. Thus, the characteristics (e.g., the coefficients $r_1$, $r_2$, and/or $r_n$) of the reception equalizer 1371 may be referenced to determine the characteristics (e.g., the coefficients $t_{-1}$, $t_0$, $t_1$, $t_{n-1}$, and/or $t_n$) of the transmission equalizer 1151, and in this case, the adaptability of the transmission equalizer 1151 for the communication channel 1210 may be improved.

Figure 8:
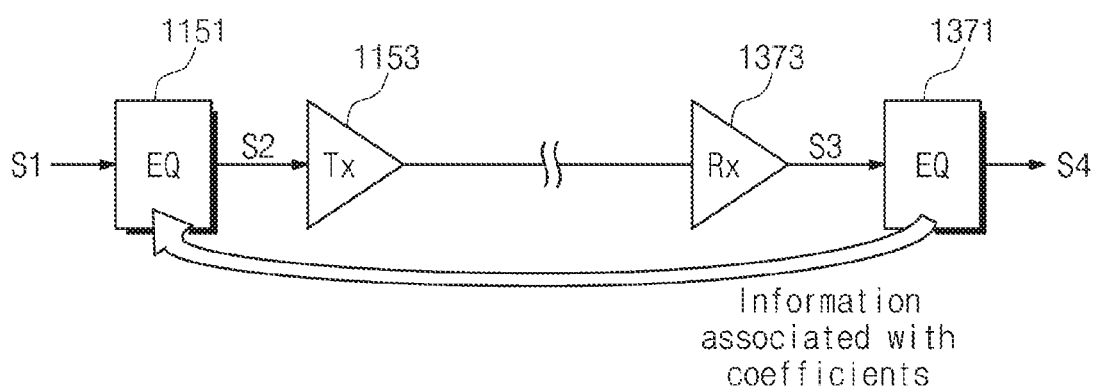
FIG. 8 is a conceptual diagram for describing information which is fed back from a reception equalizer of FIG. 1 to a transmission equalizer of FIG. 1.

FIG. 8 is a conceptual diagram for describing information which is fed back from the reception equalizer 1371 of FIG. 1 to the transmission equalizer 1151 of FIG. 1. For ease in illustration below, the communication channels 1210 and 1250 will be omitted from the following drawings.

For example, a training operation may be performed before the electronic devices 1100 and 1300 initiate a normal communication. In the training operation, each of the electronic devices 1100 and 1300 may recognize an operation condition and a communication condition of a counterpart device, and accordingly may prepare a setting for the normal communication. After the training operation is completed, the normal communication may be performed. For example, the training operation may be performed while the electronic devices 1100 and 1300 are booted, after a connection between the electronic devices 1100 and 1300 is initialized, and/or as an error or a failure occurs in the operations of the electronic devices 1100 and 1300, but some example embodiments not limited thereto.

In some example embodiments, during the training operation, the characteristics of the equalizer 1151 may be adjusted or improved based on the characteristics of the equalizer 1371. As the adaptability of the equalizer 1151 for the communication channel 1210 is improved, the role of the equalizer 1371 may be reduced. To this end, during the training operation, control information associated with the characteristics (e.g., the coefficients $r_1$, $r_2$, and/or $r_n$) of the equalizer 1371 may be fed back for the equalizer 1151.

In some implementations, a method of monitoring an eye diagram of the signal S4 while adjusting controllable coefficients of the equalizer 1151 to search for optimized or improved values of the controllable coefficients of the equalizer 1151 may be used. However, this method may employ a large number of samples, and may make a time taken for the training operation get longer.

On the other hand, according to the some example embodiments using the control information associated with the characteristics of the equalizer 1371, the characteristics of the equalizer 1151 may be adjusted in a simple manner based on the values of the coefficients $r_1$, $r_2$, and/or $r_n$. Accordingly, an amount of the fed-back control information may be reduced, and the training operation may be completed within a shorter time. An example training operation will be described with reference to FIGS. 9 to 13.

Figure 9:
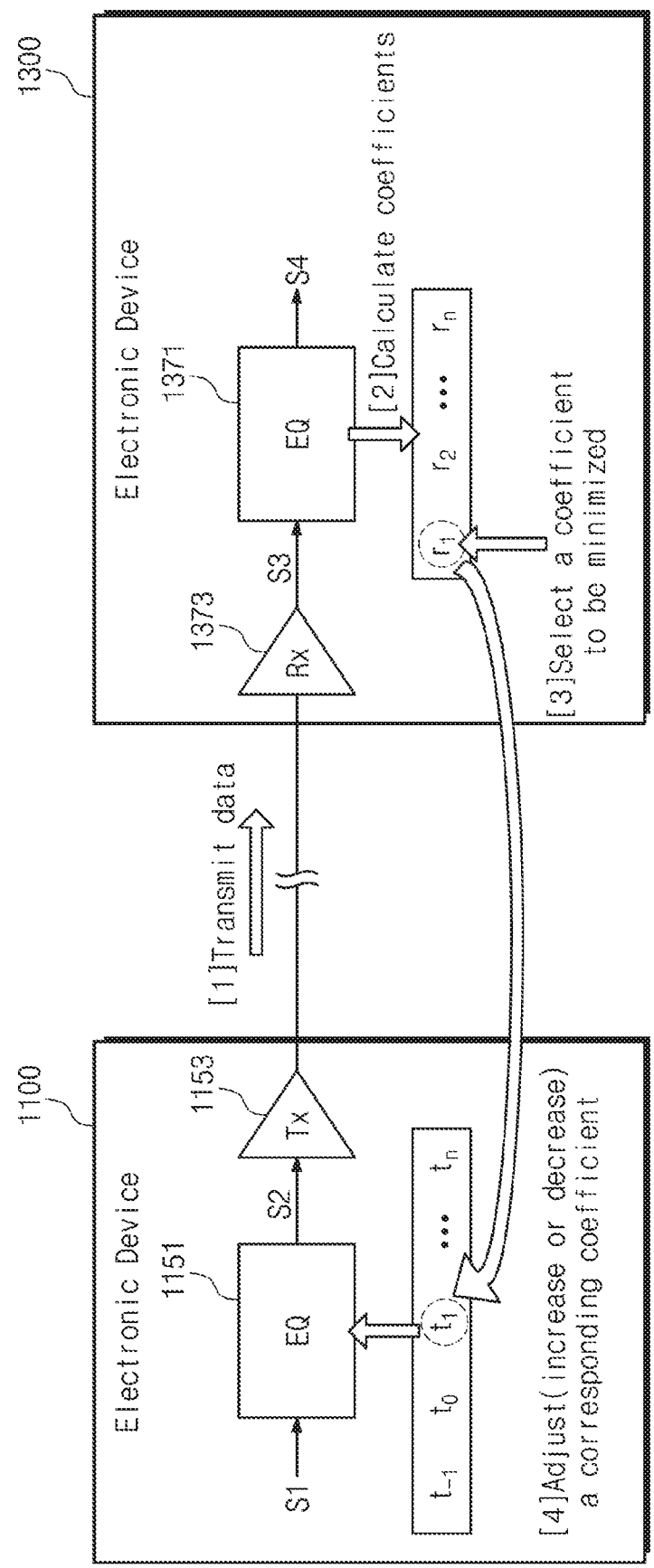
FIGS. 9 and 10 are conceptual diagrams for describing an example training operation for adapting coefficients of a transmission equalizer of FIG. 1, which is based on coefficients of a reception equalizer of FIG. 1.
Figure 10:
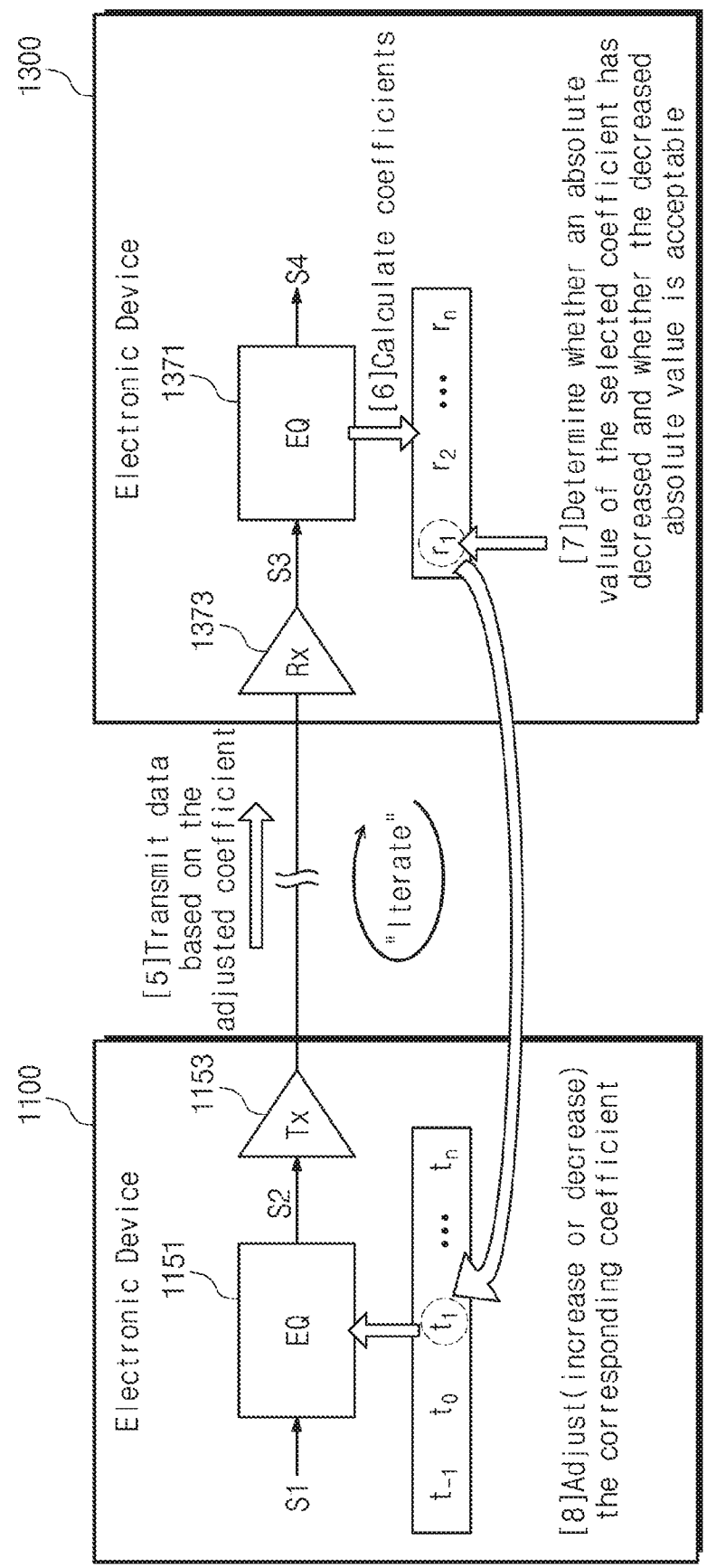

FIGS. 9 and 10 are conceptual diagrams for describing an example training operation for adapting coefficients of the transmission equalizer 1151 of FIG. 1, which is based on coefficients of the reception equalizer 1371 of FIG. 1. It may be readily understood that a training operation between the transmission equalizer 1351 and the reception equalizer 1171 may be performed similarly to that described below.

Referring to FIG. 9, the electronic device 1100 may output the signal S2 through the transmitter 1153, and thus may transmit data to the electronic device 1300 (operation [1]). For example, the data transmitted to the electronic device 1300 may contain data of a training pattern for performing the training operation (e.g., the data of the training pattern would include the training pattern). The training pattern may be previously defined depending on an interface protocol which is employed for communication between the electronic devices 1100 and 1300.

The receiver 1373 may receive a signal from the electronic device 1100, and thus may provide the signal S3 to the reception equalizer 1371. The reception equalizer 1371 may perform an equalization on the signal S3 to generate the signal S4.

Meanwhile, the coefficients $r_1$, $r_2$, and/or $r_n$ associated with the characteristics of the reception equalizer 1371 may be calculated (operation [2]). In the training operation, the coefficients $r_1$, $r_2$, and/or $r_n$ may be adaptively adjusted depending on the characteristics of the communication channel 1210 and the characteristics of the signal S3. Thus, the coefficients $r_1$, $r_2$, and/or $r_n$ may be adjusted depending on signals which are received from the electronic device 1100 through the communication channel 1210. According to some example embodiments, the coefficients $r_1$, $r_2$, and/or $r_n$ associated with the characteristics of the reception equalizer 1371 may be adjusted before, after or contemporaneously (e.g., in parallel) with the performance of the equalization of the signal S3 by the reception equalizer 1371. For example, the equalization may be performed using the adjusted coefficients, according to some example embodiments.

When an absolute value of each of the coefficients $r_1$, $r_2$, and/or $r_n$ is relatively high (e.g., greater than a determined, set or selected threshold value), this may mean that the role of the reception equalizer 1371 is high. As the role of the reception equalizer 1371 is reduced, the absolute value of each of the coefficients $r_1$, $r_2$, and/or $r_n$ may be decreased (e.g., the coefficients $r_1$, $r_2$, and/or $r_n$ may become close to zero). When the coefficients $r_1$, $r_2$, and/or $r_n$ are adjusted or changed, the characteristics of the signal S4 output from the reception equalizer 1371 may be changed.

Some example embodiments may be provided to decrease or minimize the absolute values of the coefficients $r_1$, $r_2$, and/or $r_n$. For example, a coefficient of which an absolute value is to be decreased or minimized may be selected from the coefficients $r_1$, $r_2$, and/or $r_n$ (operation [3]). At least one coefficient among the coefficients $r_1$, $r_2$, and/or $r_n$ may be selected in a fixed order, an arbitrary order, and/or an order based on a specific condition. In some cases, a decrease or minimization of an absolute value of one coefficient may affect (e.g., increase) other coefficient. In such cases, one or more coefficients may be selected at least twice for optimization or improvement.

The electronic device 1300 may generate control information with regard to a selected coefficient (e.g., the coefficient $r_1$). The control information may be fed back to the electronic device 1100 for the transmission equalizer 1151. In some example embodiments, the control information may be transmitted to the electronic device 1100 through the transmitter 1353, the communication channel 1250, and the receiver 1173. In some example embodiments, to transmit the control information, an additional channel (e.g., a sideband channel) may be provided between the electronic devices 1100 and 1300.

The coefficients $t_{-1}$, $t_0$, $t_1$, $t_{n-1}$, and/or $t_n$ associated with the characteristics of the transmission equalizer 1151 may be controlled or adjusted based on the control information. In some example embodiments, the control information may contain an indication of a coefficient, among the coefficients $t_{-1}$, $t_0$, $t_1$, $t_{n-1}$, and/or $t_n$, which is to be adjusted corresponding to the selected coefficient (e.g., the coefficient $r_1$) of the reception equalizer 1371.

For example, the coefficients $r_1$, $r_2$, and $r_n$ may affect different signal components, respectively (e.g., a frequency of a signal component affected by the coefficient $r_1$ may be different from a frequency of a signal component affected by the coefficient $r_n$). Likewise, the coefficients $t_{-1}$, $t_0$, $t_1$, $t_{n-1}$, and $t_n$ may affect different signal components respectively. For example, when a signal component affected by the coefficient $t_1$ corresponds to a signal component affected by the coefficient $r_1$, the control information may indicate that the coefficient $t_1$ is to be adjusted.

In some example embodiments, the control information may contain an indication of whether the coefficient to be adjusted (e.g., the coefficient $t_1$) is to be increased or decreased. Thus, the coefficient $t_1$ may be increased or decreased based on the control information (operation [4]). As the control information is transmitted such that at least one coefficient (e.g., the coefficient $t_1$) among the coefficients $t_{-1}$, $t_0$, $t_1$, $t_{n-1}$, and/or $t_n$ is adjusted, the characteristics of the transmission equalizer 1151 may be changed. The transmission equalizer 1151 may perform a pre-equalization on the signal S1 to generate the signal S2, based on the coefficients $t_{-1}$, $t_0$, $t_1$, $t_{n-1}$, and/or $t_n$ including the adjusted coefficient $t_1$.

Referring to FIG. 10, the electronic device 1100 may transmit data to the electronic device 1300 based on the new signal S2 (operation [5]). The transmitted data may be provided depending on an operation of the transmission equalizer 1151 which is performed based on the adjusted coefficient $t_1$. Thus, the reception equalizer 1371 may receive the new signal S3 following the preceding signal S3. The new signal S3 may be received from the electronic device 1100 based on the control information which has been transmitted to the electronic device 1100 with regard to the preceding signal S3.

The reception equalizer 1371 may perform an equalization on the new signal S3 received based on the coefficient $t_1$ which is adjusted after the previous signal S3 is received. To this end, the coefficients $r_1$, $r_2$, and/or $r_n$ may be calculated again based on the new signal S3 (operation [6]).

When the characteristics of the transmission equalizer 1151 are changed, the characteristics of the signal S2 to be transmitted to the electronic device 1300 and the characteristics of the signal S3 received in the electronic device 1300 may also be changed. As the coefficients $r_1$, $r_2$, and/or $r_n$ may be adjusted depending on signals received through the communication channel 1210, the selected coefficient (e.g., the coefficient $r_1$) may be adjusted depending on the new signal S3. For example, the coefficient $r_1$ may be calculated again as increased or decreased (e.g., an adjusted coefficient $r_1$) depending on the characteristics of the new signal S3. The reception equalizer 1371 may perform an equalization on the new signal S3 based on the coefficients $r_1$, $r_2$, and/or $r_n$ including the adjusted coefficient $r_1$.

As described above, it may be advantageous to decrease or minimize the absolute values of the coefficients $r_1$, $r_2$, and/or $r_n$. Thus, the electronic device 1300 may determine whether the absolute value of the selected coefficient $r_1$ among the coefficients $r_1$, $r_2$, and/or $r_n$ has increased or decreased, based on the calculated coefficients $r_1$, $r_2$, and/or $r_n$. In addition, the electronic device 1300 may determine whether the decreased absolute value of the coefficient $r_1$ is acceptable (operation [7]).

For example, the absolute value of the coefficient $r_1$ may be acceptable when it becomes zero or approximately zero. Alternatively, the absolute value of the coefficient $r_1$ may be acceptable when it becomes smaller than a critical value or a reference value. The critical value or the reference value may be determined, set and/or variously selected taking into account the role of the reception equalizer 1371.

When the decreased absolute value of the coefficient $r_1$ is acceptable, the calculated value of the coefficient $r_1$ may be used for an operation of the reception equalizer 1371 during normal communication after the training operation is completed. When the decreased absolute value of the coefficient $r_1$ is not acceptable or the absolute value of the coefficient $r_1$ has increased, the absolute value of the coefficient $r_1$ may be further adjusted to be sufficiently decreased or minimized. To this end, the control information may be transmitted to the electronic device 1100 with regard to an increase or a decrease in the absolute value of the coefficient $r_1$.

If absolute value of the coefficient $r_1$ is not acceptable, the coefficient $t_1$ corresponding to the coefficient $r_1$ may be further adjusted based on the control information (operation [8]). When the coefficient $t_1$ is further adjusted, the characteristics of the transmission equalizer 1151 and the characteristics of the signals S2 and S3 may be changed, and thus the coefficient $r_1$ may be further adjusted. These operations may be iterated until the absolute value of the coefficient $r_1$ becomes acceptable or a termination condition is satisfied.

In other words, with regard to the coefficient $r_1$ being adjusted as signals are sequentially received from the electronic device 1100, the electronic device 1300 may iteratively generate the control information to be transmitted to the electronic device 1100. As the control information is iteratively transmitted to the electronic device 1100, the coefficient $t_1$ may be adjusted, thereby resulting in a new signal S3 by which the coefficient $r_1$ may be further adjusted. In some example embodiments, the coefficient $r_1$ may be adjusted such that the absolute value of the coefficient $r_1$ is decreased. For example, the absolute value of the coefficient $r_1$ for the equalization of the new signal S3 may become smaller than the absolute value of the coefficient $r_1$ for the equalization of the preceding signal S3.

As such, feeding back the control information may be iterated until the absolute value of the coefficient $r_1$ becomes acceptable or the termination condition is satisfied, such that the absolute value of the coefficient $r_1$ is decreased as the coefficient $t_1$ is adjusted. When the absolute value of the coefficient $r_1$ decreases, the role of the reception equalizer 1371 may be reduced. When the role of the reception equalizer 1371 is reduced, the characteristics of the signal S3 may become closer to the characteristics of the signal S4.

Also, when the role of the reception equalizer 1371 is reduced, the role of the transmission equalizer 1151 may be increased and performance of the transmission equalizer 1151 may be improved. Thus, performance and efficiency of the equalization and the pre-equalization in the entire electronic system 1000 may be improved.

When generating and transmitting the control information with regard to the coefficient $r_1$ is completed (e.g., when the termination condition is satisfied), new control information may be iteratively generated to adjust another coefficient (e.g., the coefficient $r_n$) different from the coefficient $r_1$. For example, when a signal component affected by the coefficient $r_n$ corresponds to a signal component affected by the coefficient $t_n$ different from the coefficient $t_1$, the new control information may be associated with whether the coefficient $t_n$ is to be increased or decreased.

As the new control information is iteratively transmitted to the electronic device 1100, the coefficient $t_n$ may be increased or decreased. As the new control information is transmitted such that the coefficient $t_n$ is adjusted, an absolute value of the coefficient $r_n$ may be increased or decreased. As such, the training operation may be performed with regard to all the coefficients $r_1$, $r_2$, and/or $r_n$ to reduce the absolute values of the coefficients $r_1$, $r_2$, and/or $r_n$ of the reception equalizer 1371.

In some implementations, a method of providing the electronic device 1100 with information of all the values of the coefficients $r_1$, $r_2$, and/or $r_n$ (e.g., the information of all the values of the coefficients includes the values of the coefficients) and applying opposite-signed values, which correspond to the values of the coefficients $r_1$, $r_2$, and/or $r_n$, to the transmission equalizer 1151 may be used. However, according to this method, an amount of information provided to the electronic device 1100 may be increased. In addition, this method may not be applied when configurations and/or types of the equalizers 1151 and 1371 are different from each other.

According to some example embodiments, controlling an increase or a decrease of the coefficients $t_{-1}$, $t_0$, $t_1$, $t_{n-1}$, and/or $t_n$ based on the control information generated with regard to the coefficients $r_1$, $r_2$, and/or $r_n$ instead of directly using the coefficients $r_1$, $r_2$, and/or $r_n$, an amount of information provided to the electronic device 1100 may be decreased, and the training operation may be completed within a shorter time. Furthermore, the use of control information may be applied even when the configurations and/or types of the equalizers 1151 and 1371 are different from each other.

The process of FIGS. 9 and 10 may be iteratively performed. For example, when the process of FIG. 9 corresponds to a first iteration, the process of FIG. 10 may correspond to a second iteration which is performed after the first iteration. Iterations similar to the first iteration and the second iteration may be performed until the termination condition is satisfied.

FIG. 11 is a table illustrating the example training operation of FIGS. 9 and 10. To facilitate better understanding, it will be assumed that the coefficient $r_1$ is selected and the coefficient $t_1$ corresponds to the coefficient $r_1$.

Each of the coefficients $r_1$ and $t_1$ may be adjusted in one of different directions (e.g., a first direction and a second direction). For example, the first direction in the adjustment may mean an increase and the second direction in the adjustment may mean a decrease, or vice versa.

In case 1, the control information may be transmitted such that the coefficient $t_1$ increases, and the absolute value of the coefficient $r_1$ increases based on the increase in the coefficient $t_1$. This may mean that the coefficient $t_1$ is to be decreased to decrease the absolute value of the coefficient $r_1$. Thus, in the next iteration, the control information may be generated such that the coefficient $t_1$ decreases.

In case 2, the control information may be transmitted such that the coefficient $t_1$ decreases, and the absolute value of the coefficient $r_1$ increases based on the decrease in the coefficient $t_1$. This may mean that the coefficient $t_1$ is to be increased to decrease the absolute value of the coefficient $r_1$. Thus, in the next iteration, the control information may be generated such that the coefficient $t_1$ increases.

In case 3, the control information may be transmitted such that the coefficient $t_1$ increases, and the absolute value of the coefficient $r_1$ decreases based on the increase in the coefficient $t_1$. However, the absolute value of the coefficient $r_1$ may not be sufficiently small. This may mean that the coefficient $t_1$ is to be further increased to further decrease the absolute value of the coefficient $r_1$. Thus, in the next iteration, the control information may be generated such that the coefficient $t_1$ further increases.

In case 4, the control information may be transmitted such that the coefficient $t_1$ decreases, and the absolute value of the coefficient $r_1$ decreases based on the decrease in the coefficient $t_1$. However, the absolute value of the coefficient $r_1$ may not be sufficiently small. This may mean that the coefficient $t_1$ is to be further decreased to further decrease the absolute value of the coefficient $r_1$. Thus, in the next iteration, the control information may be generated such that the coefficient $t_1$ further decreases.

In case 5, the control information may be transmitted such that the coefficient $t_1$ increases or decreases, and the absolute value of the coefficient $r_1$ becomes sufficiently small based on the increase or the decrease in the coefficient $t_1$. In this case, the coefficient $r_1$ may be acceptable. Thus, iterations for the coefficient $r_1$ may be done, and iterations for other coefficient(s) may be performed or the training operation may be finished.

Figure 12:
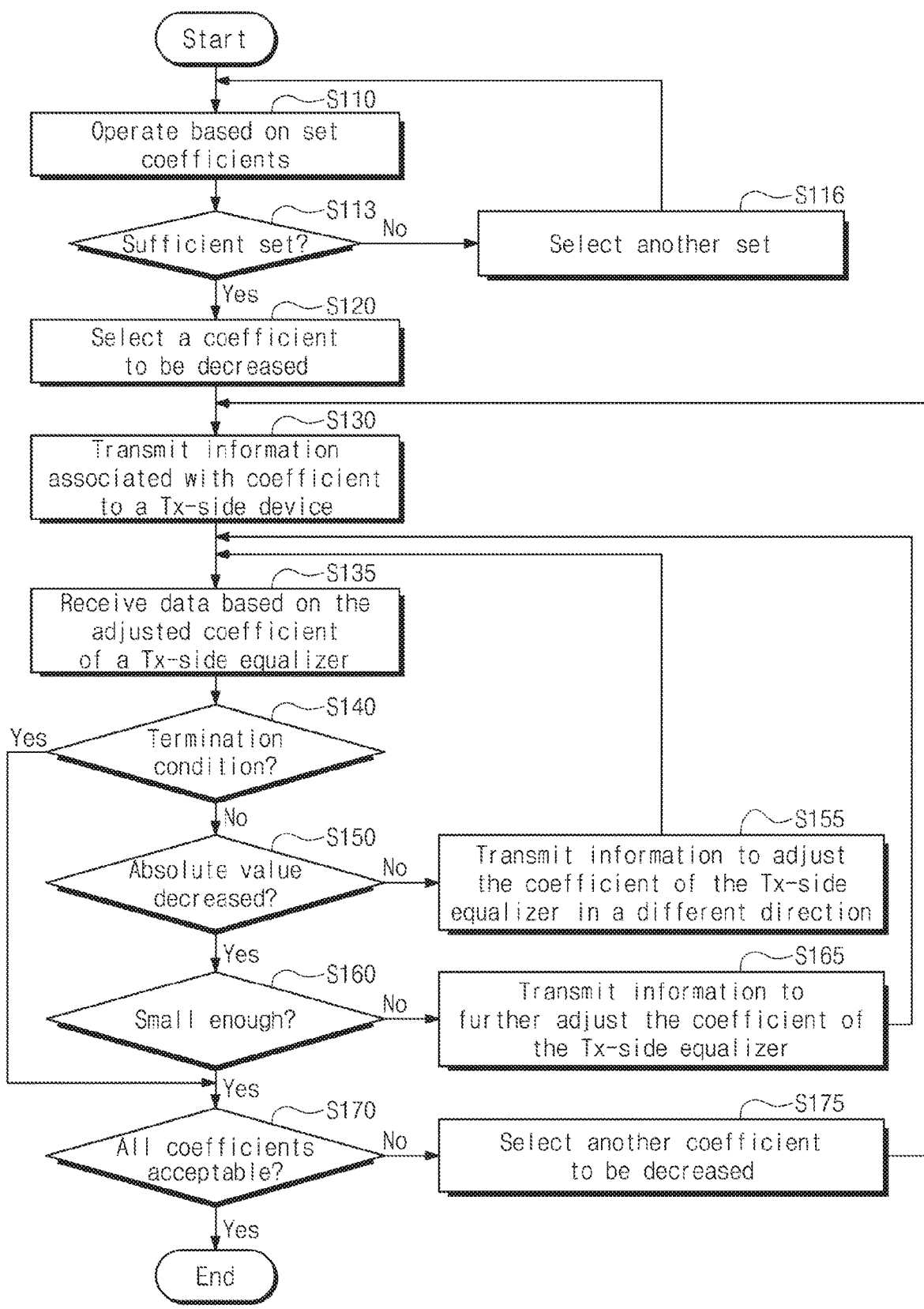
FIG. 12 is a flowchart illustrating an example operation which is associated with a reception equalizer of FIG. 1 in an example training operation of FIGS. 9 and 10.

FIG. 12 is a flowchart illustrating an example operation which is associated with the reception equalizer 1371 of FIG. 1 in the example training operation of FIGS. 9 and 10. It may be readily understood that the reception equalizer 1171 may operate similarly to the reception equalizer 1371.

In some example embodiments, the reception equalizer 1371 may start to operate based on set coefficients which may be prepared in advance before the reception equalizer 1371 operates (S110). For example, the set coefficients may correspond to coefficients which were expected to be acceptable from a test or an experiment. Alternatively, the set coefficients may correspond to default coefficients which have been provided by a designer or a user. The set coefficients may be provided for an initial operation of the reception equalizer 1371.

The electronic device 1300 may determine whether the selected set coefficients are sufficient (S113). If not (e.g., when it is observed that the selected set coefficients result in high inter-symbol interference) (No of S113), the electronic device 1300 may select other set coefficients for the initial operation of the reception equalizer 1371 (S116). If the selected set coefficients are sufficient (Yes of S113), a coefficient of which an absolute value is to be decreased or minimized (e.g., the coefficient $r_1$) may be selected (S120). For example, the selected coefficient $r_1$ may be changed (e.g., increased or decreased) from the set coefficient.

The electronic device 1300 may transmit the control information, which is generated with regard to the coefficient $r_1$, to the electronic device 1100 (e.g., the TX-side device) (S130). Afterwards, a corresponding coefficient (e.g., the coefficient $t_1$) of the transmission equalizer 1151 may be adjusted, and the electronic device 1300 may receive data transmitted based on the adjusted coefficient $t_1$ (S135).

The electronic device 1300 may determine whether a termination condition is satisfied with regard to the coefficient $r_1$ (S140). In some example embodiments, the termination condition may be satisfied when the absolute value of the coefficient $r_1$ is acceptable (e.g., becomes smaller than a reference value). In some example embodiments, the termination condition may be satisfied when generating and transmitting the control information with regard to the coefficient $r_1$ is iterated by a reference iteration number (e.g., for a reference number of iterations) or is performed for a reference time duration while the training operation is performed. However, some example embodiments are not limited to these examples, and the termination condition may be variously changed or modified.

When the termination condition is not satisfied (No of S140) and the absolute value of the coefficient $r_1$ is determined to be increased (No of S150), the electronic device 1300 may transmit the control information such that the coefficient $t_1$ is adjusted in a different direction (S155) (e.g., in the cases 1 and 2 of FIG. 11). When the absolute value of the coefficient $r_1$ is determined to be decreased (Yes of S150) but not to be sufficiently small (No of S160), the electronic device 1300 may transmit the control information such that the coefficient $t_1$ is further adjusted in the same direction (S165) (e.g., in the cases 3 and 4 of FIG. 11).

When the absolute value of the coefficient $r_1$ is determined to be sufficiently small (Yes of S160) or the termination condition is satisfied (Yes of S140), the electronic device 1300 may determine whether all the coefficients $r_1$, $r_2$, and/or $r_n$ are acceptable (S170). When there is an unacceptable coefficient (No of S170), the electronic device 1300 may select another coefficient of which an absolute value is to be decreased or minimized (S175), and operation S130 to operation S170 may be iterated. Here, a coefficient which has never been selected may be selected, or a coefficient which has been selected once or more may be selected again. When all the coefficients $r_1$, $r_2$, and/or $r_n$ are acceptable (Yes of S170), the training operation may be completed.

As described above, in some example embodiments, generating and transmitting the control information with regard to the coefficient $r_1$ may be iterated by a reference iteration number or for a reference time duration while the training operation is performed. When the absolute value of the coefficient $r_1$ does not become sufficiently small, the coefficient $r_1$ of the smallest value which is obtained during the iterations by the reference iteration number or for the reference time duration (e.g., when the termination condition is satisfied) may be used for the operation of the reception equalizer 1371 in the normal communication after the training operation is completed.

Figure 13:
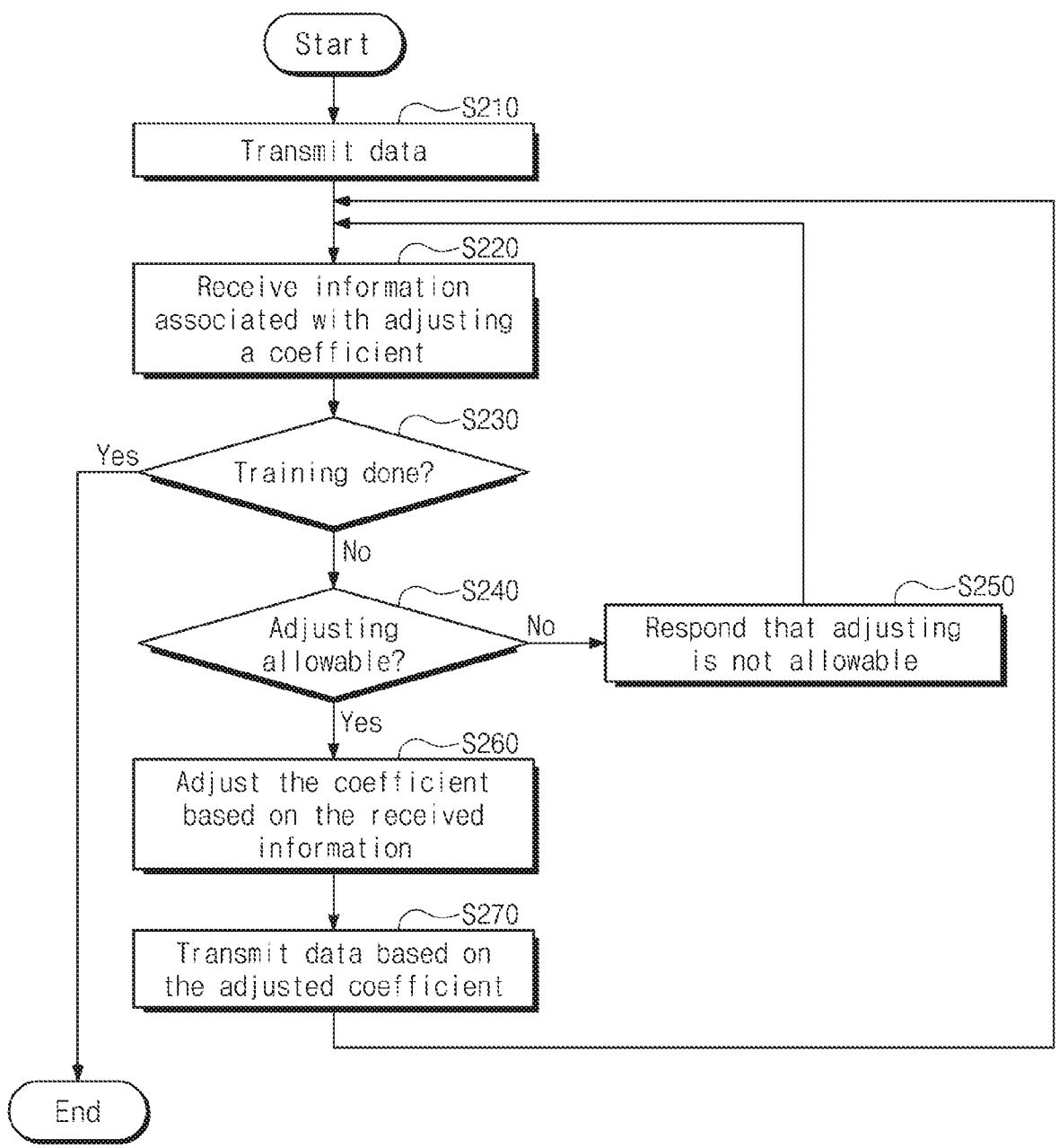
FIG. 13 is a flowchart illustrating an example operation which is associated with a transmission equalizer of FIG. 1 in an example training operation of FIGS. 9 and 10.

FIG. 13 is a flowchart illustrating an example operation which is associated with the transmission equalizer 1151 of FIG. 1 in the example training operation of FIGS. 9 and 10. It may be readily understood that the transmission equalizer 1351 may operate similarly to the transmission equalizer 1151.

The electronic device 1100 may transmit data to the electronic device 1300 (S210). Afterwards, the coefficient $r_1$ may be adjusted based on signals received in the electronic device 1300. The electronic device 1300 may receive control information with regard to an increase or a decrease in the coefficient $r_1$ (S220).

In some cases, the control information may indicate that the training operation is completed (Yes of S230). In this case, the electronic device 1100 may recognize completion of the training operation based on the control information. On the other hand, when the training operation is not completed (No of S230), the electronic device 1300 may determine whether adjusting (e.g., increasing or decreasing) the coefficient $t_1$ indicated based on the control information is allowable (S240).

For example, when the coefficient indicated by the control information is irrelevant to the characteristics of the transmission equalizer 1151 or is fixed so that the indicated coefficient is not to be arbitrarily adjusted, the adjusting may not be allowable. In some cases, an adjustable range for the coefficient $t_1$ may be provided. For example, when adjusting the coefficient $t_1$ indicated by the control information causes violation of an allowable condition (e.g., when the coefficient $t_1$ is excessively increased or decreased beyond the adjustable range), the adjusting may not be allowable. However, some example embodiments are not limited to these examples, and an allowance decision may be variously changed or modified.

When the adjusting is not allowable (No of S240), the electronic device 1100 may respond to the electronic device 1300 that the adjusting is not allowable (S250). When adjusting is allowable (Yes of S240), the electronic device 1100 may adjust the coefficient $t_1$ such that the coefficient $t_1$ is increased or decrease based on the control information (S260). Afterwards, the electronic device 1100 may transmit new data to the electronic device 1300 based on the adjusted coefficient $t_1$ (S270).

Meanwhile, at a time point where the decrease or minimization of the coefficient $r_1$ is completed and the training operation is completed (Yes of S230), adjusting the coefficient $t_1$ may also be completed. The coefficient $t_1$ of which adjusting is completed may be used for the operation of the transmission equalizer 1151 in the normal communication after the training operation is completed.

Figure 14:
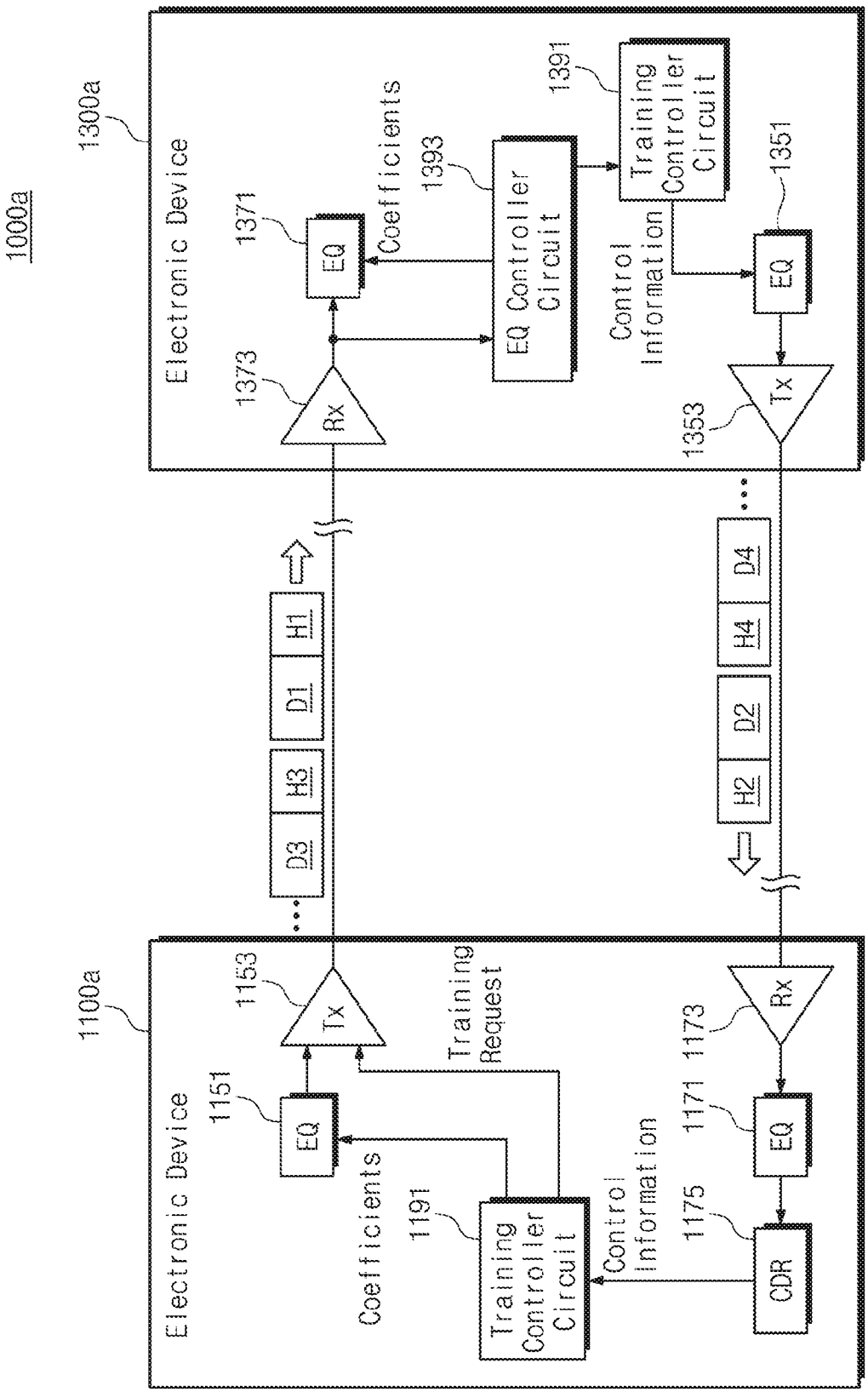
FIG. 14 is a block diagram illustrating an example configuration of an electronic system associated with an example training operation of FIGS. 9 and 10.

FIG. 14 is a block diagram illustrating an example configuration of the electronic system 1000 associated with the example training operation of FIGS. 9 and 10. The example configuration of FIG. 14 may be associated with a training operation for the equalizers 1151 and 1371.

In some example embodiments, the electronic system 1000 may include an electronic system 1000a of FIG. 14. The electronic system 1000a may include electronic devices 1100a and 1300a. The electronic devices 1100 and 1300 of the electronic system 1000 may include the electronic devices 1100a and 1300a, respectively.

In some example embodiments, the electronic device 1300a may include a training controller circuit 1391 and an EQ controller circuit 1393. The training controller circuit 1391 and the EQ controller circuit 1393 may control and manage overall processes associated with the reception equalizer 1371 in the training operation. For example, the operation of FIG. 12 may be performed under control of the training controller circuit 1391 and the EQ controller circuit 1393.

For example, the EQ controller circuit 1393 may monitor the characteristics of the communication channel 1210 and/or characteristics of signals received by the receiver 1373. Thus, the EQ controller circuit 1393 may calculate the suitable coefficients $r_1$, $r_2$, and/or $r_n$ of the reception equalizer 1371 based on the received signals. The EQ controller circuit 1393 may control the reception equalizer 1371 such that the reception equalizer 1371 operates depending on the characteristics (e.g., based on the coefficients $r_1$, $r_2$, and/or $r_n$).

The EQ controller circuit 1393 may provide the training controller circuit 1391 with information of the calculated coefficients $r_1$, $r_2$, and/or $r_n$ (e.g., the information of the calculated coefficients includes the values of the calculated coefficients). Furthermore, the EQ controller circuit 1393 may transfer a variety of information received from the electronic device 1100a to the training controller circuit 1391.

The training controller circuit 1391 may select a coefficient of which an absolute value is to be decreased or minimized (e.g., the coefficient $r_1$), and may determine whether the absolute value of the coefficient $r_1$ is increased or decreased and whether the absolute value of the coefficient $r_1$ is acceptable, based on the information of the calculated coefficients $r_1$, $r_2$, and/or $r_n$. Furthermore, the training controller circuit 1391 may generate control information with regard to the coefficient $r_1$. The training controller circuit 1391 may generate the control information according to the examples and example embodiments described with reference to FIGS. 9 to 11. The above operations of the training controller circuit 1391 and the EQ controller circuit 1393 may be performed while the training operation is performed.

The control information may be transmitted to the electronic device 1100a through the transmitter 1353 (in some cases, further through the transmission equalizer 1351). As described above, the training controller circuit 1391 may iteratively generate and transmit the control information. For example, the above operations of the training controller circuit 1391 may be iterated until a termination condition is satisfied with regard to the coefficient $r_1$.

In some example embodiments, the electronic device 1100a may include a training controller circuit 1191. The training controller circuit 1191 may control and manage overall processes associated with the transmission equalizer 1151 in the training operation. For example, the operation of FIG. 13 may be performed under control of the training controller circuit 1191.

The training controller circuit 1191 may operate based on the control information received from the electronic device 1300a. For example, the control information may be received through the receiver 1173, the reception equalizer 1171, and/or the CDR circuit 1175. The training controller circuit 1191 may obtain information associated with a coefficient to be adjusted (e.g., the coefficient $t_1$), and information associated with a direction in which the coefficient $t_1$ is to be adjusted, from the control information. The training controller circuit 1191 may select the coefficient to be adjusted (e.g., the coefficient $t_1$) from the coefficients $t_{-1}$, $t_0$, $t_1$, $t_{n-1}$, and/or $t_n$, based on an indication included in the control information.

The training controller circuit 1191 may control the transmission equalizer 1151 such that the coefficient $t_1$ is adjusted based on the control information. The training controller circuit 1191 may increase or decrease the coefficient $t_1$ based on the indication in the control information.

The training controller circuit 1191 may transmit a training request to the electronic device 1300a through the transmitter 1153. The training request may include a request for performing the training operation, and/or may include a variety of information associated with the training operation.

The controller circuits 1191, 1391, and 1393 may be implemented as various hardware circuits (e.g., an analog circuit and/or a logic circuit) to perform the above-described operations. According to some example embodiments, any or all of the training controller circuit 1391, the EQ controller circuit 1393 and/or the training controller circuit 1191 may be implemented using circuits or circuitry (e.g., an analog and/or digital circuit) and/or at least one processor executing firmware. Operations described herein as being performed by any or all of the training controller circuit 1391, the EQ controller circuit 1393 and/or the training controller circuit 1191 may be performed by at least one processor executing program code that includes instructions corresponding to the operations. The instructions may be stored in a memory of the respective electronic device (e.g., the electronic device 1100a or the electronic device 1300a). It may be readily understood that the controller circuits 1191, 1391, and 1393 may be designed in various configurations to generate an intended output based on a given input according to the above descriptions.

For example, signals may be transferred in a frame or packet between the electronic devices 1100a and 1300a. Each frame or each packet may include a header and data. For example, a signal corresponding to a header H1 and data D1 is transferred from the electronic device 1100a to the electronic device 1300a, and a signal corresponding to a header H2 and data D2 may be transferred from the electronic device 1300a to the electronic device 1100a. Afterwards, a signal corresponding to a header H3 and data D3 may be transferred from the electronic device 1100a to the electronic device 1300a, and a signal corresponding to a header H4 and data D4 may be transferred from the electronic device 1300a to the electronic device 1100a. In such a manner, the electronic devices 1100a and 1300a may communicate data/signals and control information with each other.

Figure 15:
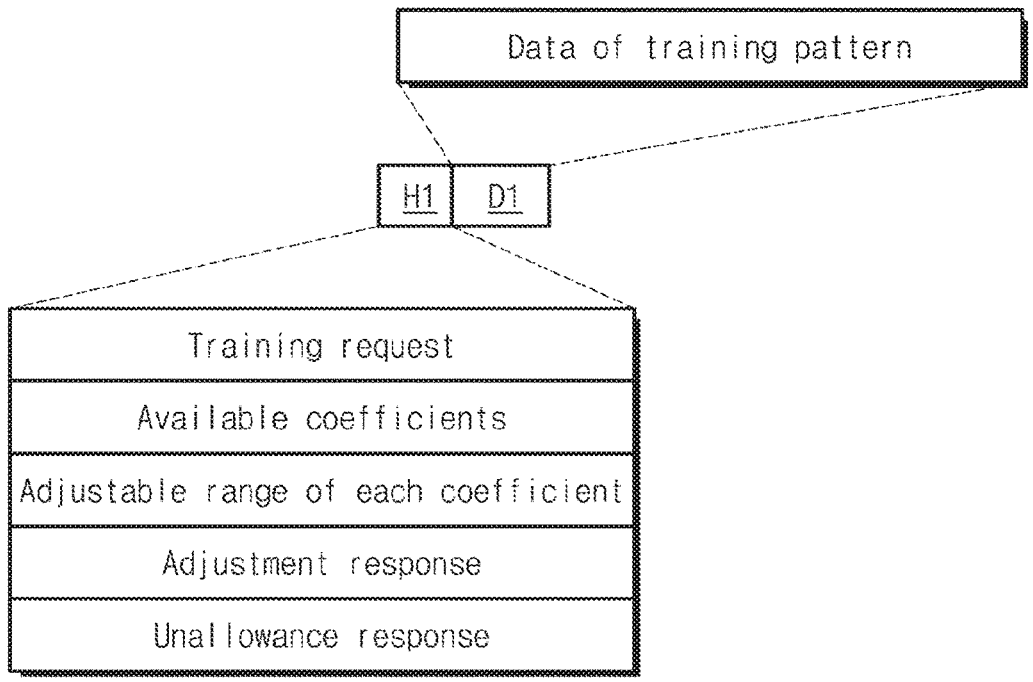
FIGS. 15 and 16 are conceptual diagrams illustrating example configurations of headers and data of FIG. 14.

FIG. 15 is a conceptual diagram illustrating an example configuration of the header H1 and the data D1 of FIG. 14. It may be readily understood that the header H3 and the data D3 may be configured similarly to the header H1 and the data D1.

For example, the header H1 may include information of a training request (e.g., the information of a training request includes an indication of the request). In some cases, the electronic device 1300a or the training controller circuit 1391 may identify that the header H1 and the data D1 are associated with the training operation based on the training request information.

For example, the header H1 may include information of available coefficients of the transmission equalizer 1151. In other words, the information in the header H1 may indicate which coefficients are provided and which coefficients are adjustable with regard to the characteristics of the transmission equalizer 1151. In some cases, the header H1 may include information of an adjustable range of each coefficient (e.g., the information of the adjustable range includes the adjustable range).

For example, the header H1 may include an adjustment response. When the electronic device 1100*a* or the training controller circuit 1191 adjusts successfully the coefficient of the transmission equalizer 1151 based on the control information, the adjustment response of the header H1 may indicate completion of the adjustment of the coefficient. For example, the header H1 may include an unallowance response. When the adjusting requested by the control information is not allowable, the unallowance response of the header H1 may indicate that such adjusting is not allowed.

However, the above examples of the header H1 are provided to facilitate better understanding, and are not intended to limit some example embodiments. The header H1 may be variously changed or modified to be suitable for performing the training operation. Meanwhile, in the training operation, the data H1 may include data of a training pattern.

Figure 16:
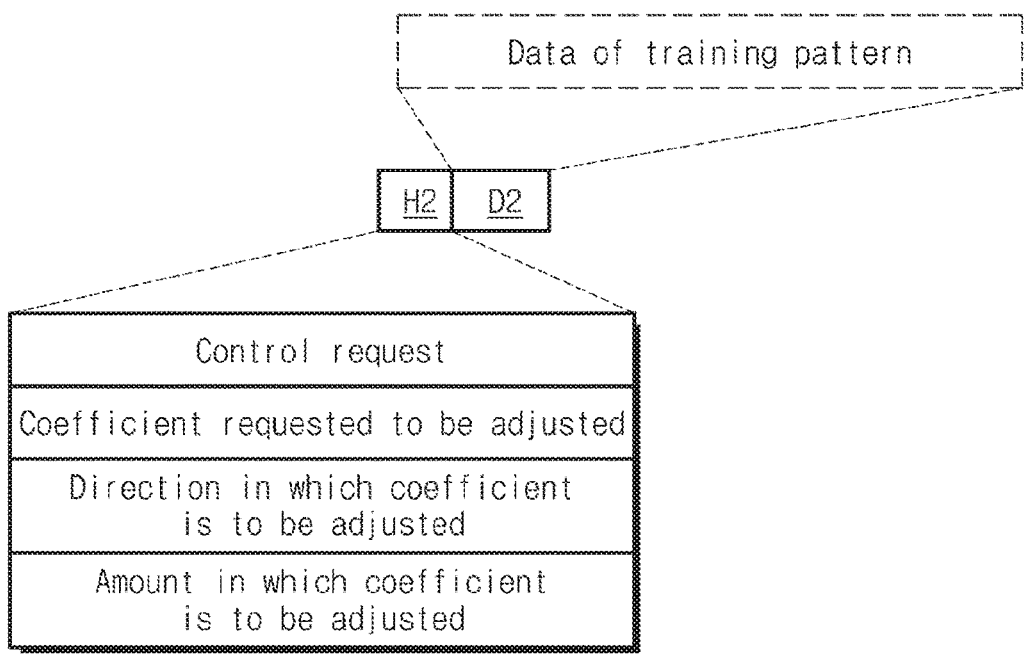

FIG. 16 is a conceptual diagram illustrating an example configuration of the header H2 and the data D2 of FIG. 14. It may be readily understood that the header H4 and the data D4 may be configured similarly to the header H2 and the data D2.

For example, the header H2 may include information of a control request (e.g., the information of the control request includes an indication of the control request). The control request may request adjusting of one or more coefficients of the transmission equalizer 1151. In some cases, the electronic device 1100*a* or the training controller circuit 1191 may identify that the header H2 and the data D2 are associated with the training operation based on the control request.

The header H2 may include the control information which has been described above. For example, the header H2 may include an indication of which coefficient among the coefficients of the transmission equalizer 1151 is to be adjusted. Furthermore, the header H2 may include an indication of a direction in which the coefficient of the transmission equalizer 1151 is to be adjusted (e.g., indication on whether the coefficient is to be increased or decreased).

In some example embodiments, the coefficient of the transmission equalizer 1151 may be adjusted by one quantized unit value (e.g., a set, determined and/or selected value) in response to each request. In some example embodiments, the coefficient of the transmission equalizer 1151 may be designed to be adjusted by several unit values or by a specific value at once. In this case, the header H2 may include an indication of an amount by which the coefficient of the transmission equalizer 1151 is to be adjusted.

However, the above examples of the header H2 are provided to facilitate better understanding, and are not intended to limit some example embodiments. The header H2 may be variously changed or modified to be suitable for performing the training operation.

As described with reference to FIG. 14, the training operation may be performed in a one-way manner with regard to the equalizers 1151 and 1371. On the other hand, in some cases, a training operation associated with the equalizers 1351 and 1171 may be performed while the training operation is performed with regard to the equalizers 1151 and 1371 (e.g., bidirectional training), and this will be described with reference to FIG. 17.

When the training operations are performed in a bidirectional manner, the header H1 of FIG. 15 may further include information corresponding to the header H2 of FIG. 16, and the header H2 of FIG. 16 may further include information corresponding to the header H1 of FIG. 15. Furthermore, the data D2 may include information of a training pattern (e.g., the information of the training pattern includes the training pattern).

Figure 17:
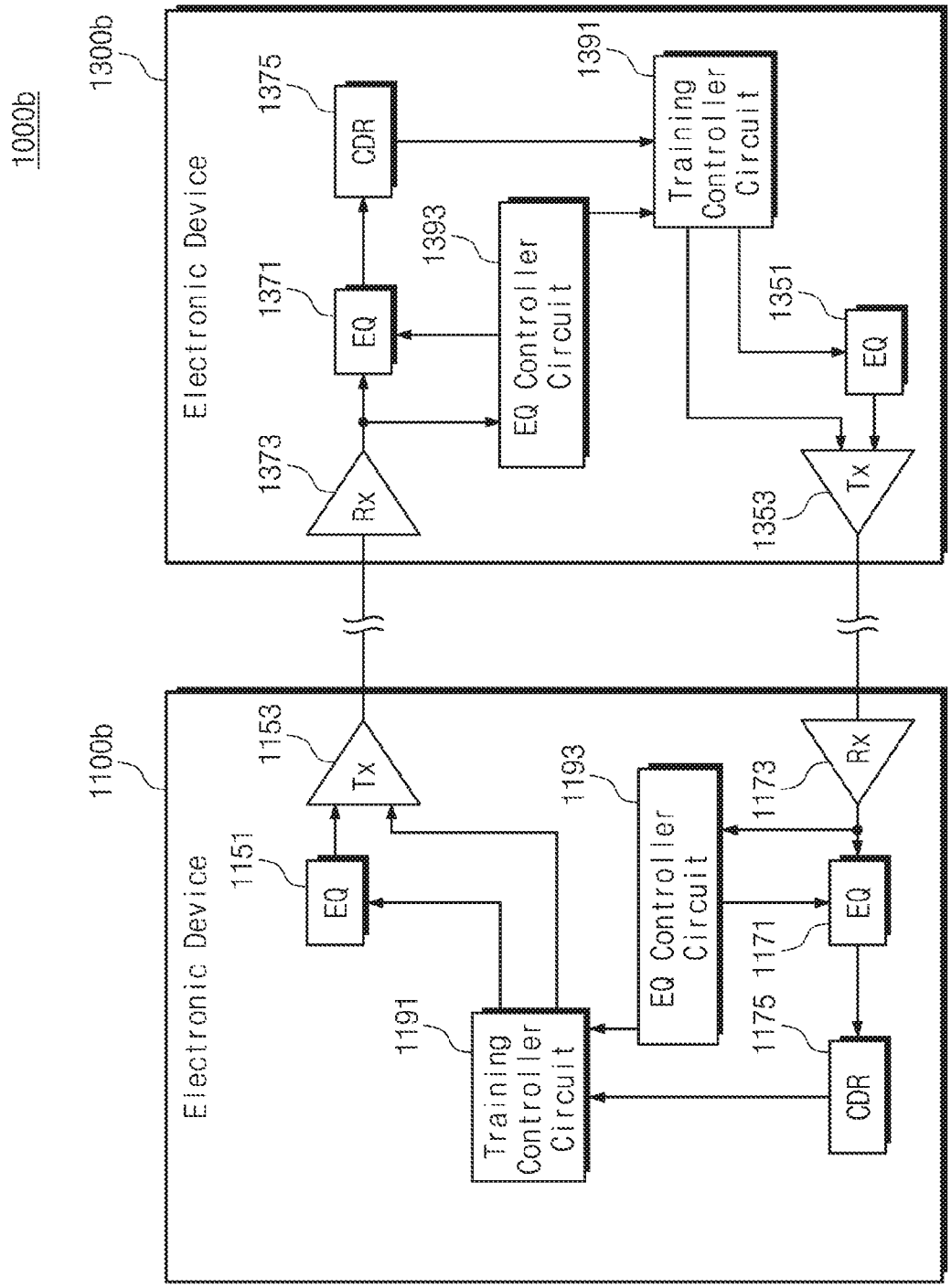
FIG. 17 is a block diagram illustrating an example configuration of an electronic system associated with an example training operation of FIGS. 9 and 10.

FIG. 17 is a block diagram illustrating an example configuration of the electronic system 1000 associated with the example training operation of FIGS. 9 and 10. The example configuration of FIG. 17 may be associated with the bidirectional training operations.

In some example embodiments, the electronic system 1000 may include an electronic system 1000*b* of FIG. 17. The electronic system 1000*b* may include electronic devices 1100*b* and 1300*b*. The electronic devices 1100 and 1300 of the electronic system 1000 may include the electronic devices 1100*b* and 1300*b*, respectively.

The electronic device 1100*b* may include an EQ controller circuit 1193. In the training operation associated with the equalizers 1351 and 1171, the EQ controller circuit 1193 may control and manage overall processes associated with the reception equalizer 1171. The EQ controller circuit 1193 may be configured and may operate similarly to or the same as the EQ controller circuit 1393. According to some example embodiments, the EQ controller circuit 1193 may be implemented using circuits or circuitry (e.g., an analog and/or digital circuit) and/or at least one processor executing firmware. Operations described herein as being performed by the EQ controller circuit 1193 may be performed by at least one processor executing program code that includes instructions corresponding to the operations. The instructions may be stored in a memory of the respective electronic device (e.g., the electronic device 1100*b*).

As described with reference to FIG. 14, the training controller circuit 1391 of the electronic device 1300*b* may generate the control information for the transmission equalizer 1151 in the training operation associated with the equalizers 1151 and 1371. Furthermore, similar to the training controller circuit 1191, the training controller circuit 1391 may control the transmission equalizer 1351 based on control information received from the training controller circuit 1191 in the training operation associated with the equalizers 1351 and 1171.

As described with reference to FIG. 14, the training controller circuit 1191 of the electronic device 1100*b* may control the transmission equalizer 1151 based on the control information received from the training controller circuit 1391 in the training operation associated with the equalizers 1151 and 1371. Furthermore, similar to the training controller circuit 1391, the training controller circuit 1191 may generate the control information for the transmission equalizer 1351 in the training operation associated with the equalizers 1351 and 1171. Thus, the training operation may be performed in a bidirectional manner.

Example embodiments of the present disclosure may be employed for various interface protocols such as Ethernet, universal serial bus (USB), peripheral component interconnect express (PCIe), and/or the like. However, some example embodiments are not limited to these examples, and may be employed to reduce a training time and improve equalization performance in high-speed communication involving a training operation. In various communication circumstances, some example embodiments of the present disclosure may be implemented to train a transmission equalizer based on characteristics of a reception equalizer.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The above descriptions are intended to provide example configurations and operations for implementing some example embodiments. Some example embodiments may include implementations which may be obtained by simply changing or modifying the above-described example embodiments, in addition to the above-described example embodiments. Also, some example embodiments may include implementations which may be accomplished by changing or modifying the above-described example embodiments in the future.

What is claimed is:

1. An electronic device comprising:
    a reception equalizer configured to perform,
        a first equalization on a first signal among a plurality of signals received from an external device, the first equalization being based on a first coefficient, and
        one or more second equalizations on one or more second signals among the plurality of signals, the one or more second equalizations being based on the first coefficient, the one or more second signals being received from the external device after the first signal is received, the one or more second signals being based on a second coefficient associated with one or more characteristics of a transmission equalizer of the external device; and
    circuitry configured to iteratively send control information generated based on the first coefficient to the external device until a termination condition is satisfied with regard to the first coefficient, the control information causing the second coefficient to be increased or decreased, the iteratively sent control information causing a first absolute value of the first coefficient corresponding to a final equalization of the one or more second equalizations to become smaller than a second absolute value of the first coefficient corresponding to the first equalization.

2. The electronic device of claim 1, wherein the control information comprises:
    an indication of the second coefficient; and
    an indication of whether the second coefficient is to be increased or decreased.

3. The electronic device of claim 1, wherein
    a plurality of reception coefficients associated with one or more characteristics of the reception equalizer affect different components of a respective signal among the plurality of signals;
    a plurality of transmission coefficients associated with one or more characteristics of the transmission equalizer affect different components of a signal to be transmitted; and
    a first signal component affected by the second coefficient among the plurality of transmission coefficients corresponds to a second signal component of the respective signal affected by the first coefficient among the plurality of reception coefficients.

4. The electronic device of claim 1, wherein the circuitry is configured to:
    select the first coefficient from among a plurality of reception coefficients associated with one or more characteristics of the reception equalizer; and
    generate the control information based on the selected first coefficient.

5. The electronic device of claim 4, wherein the circuitry is configured to:
    calculate the plurality of reception coefficients based on the first signal; and
    determine whether a respective absolute value of the first coefficient is increased or decreased based on the calculated plurality of reception coefficients.

6. The electronic device of claim 5, wherein the circuitry is configured to:
    generate the control information in a second iteration in response to determining that the respective absolute value of the first coefficient is increased as a result of previous control information sent in a first iteration, the previous control information causing the second coefficient to be adjusted in a first direction, the control information causing the second coefficient to be adjusted in a second direction different from the first direction.

7. The electronic device of claim 5, wherein the circuitry is configured to:
    iteratively perform until the termination condition is satisfied,
        the calculation of the plurality of reception coefficients,
        the determination of whether the respective absolute value is increased or decreased, and
        the generation of the control information.

8. The electronic device of claim 5, wherein the calculation of the plurality of reception coefficients, the determination of whether the respective absolute value is increased or decreased, and the generation of the control information, are performed during a training operation.

9. An electronic device comprising:
    a reception equalizer configured to perform an equalization on a plurality of signals received from an external device based on a first coefficient, the plurality of signals includes a first signal and one or more second signals received after the first signal, the first coefficient being adjusted based on the plurality of signals; and
    circuitry configured to iteratively generate first control information based on the first coefficient to be transmitted to the external device in response to the plurality of signals, the one or more second signals being based on the first control information, the iteratively generated first control information causing a final absolute value of the first coefficient to decrease with respect to an initial absolute value of the first coefficient.

10. The electronic device of claim 9, wherein the circuitry is configured to:
    calculate a plurality of reception coefficients associated with one or more characteristics of the reception equalizer based on the plurality of signals;
    select the first coefficient from among the plurality of reception coefficients;
    determine whether a respective absolute value of the first coefficient is increased or decreased based on the calculated plurality of reception coefficients; and
    generate the first control information based on the determination of whether the respective absolute value of the first coefficient is increased or decreased.

11. The electronic device of claim 9, wherein
    the first control information causes a second coefficient associated with one or more characteristics of a transmission equalizer of the external device to increase or decrease, the plurality of signals being based on the second coefficient such that the increase or decrease of the second coefficient causes the first coefficient to increase or decrease.

12. The electronic device of claim 9, wherein the circuitry is configured to:
    iterate, a reference number of times, during a training operation,
        the generation of the first control information, and
        sending the first control information.

13. The electronic device of claim 9, wherein the circuitry is configured to:
    iteratively generate second control information to be sent to the external device when a termination condition for the first coefficient is satisfied, the second control information being based on a third coefficient of the reception equalizer different from the first coefficient, the third coefficient being adjusted based on the plurality of signals, the iteratively generated second control information causing a final absolute value of the third coefficient to decrease.

14. The electronic device of claim 11, wherein the circuitry is configured to:
    generate the first control information in response to determining that a respective absolute value of the first coefficient is increased as a result of previous first control information sent to the external device, that the previous first control information causing the second coefficient to be adjusted in a first direction, the first control information causing the second coefficient to be adjusted in a second direction different from the first direction.

15. The electronic device of claim 11, wherein the circuitry is configured to:
    generate the first control information in response to determining that a respective absolute value of the first coefficient is decreased as a result of previous first control information sent to the external device, that the previous first control information causing the second coefficient to be adjusted in a first direction, the first control information causing the second coefficient to be further adjusted in the first direction.

16. The electronic device of claim 12, wherein the final absolute value of the first coefficient is a smallest absolute value obtained during the training operation, the first coefficient corresponding to the final absolute value being used for an operation of the reception equalizer in normal communication with the external device after the training operation is completed.

17. The electronic device of claim 13, wherein
    the first control information causes a second coefficient associated with one or more characteristics of a transmission equalizer of the external device to increase or decrease,
    the second control information causes a fourth coefficient, which is associated with the one or more characteristics of the transmission equalizer and is different from the second coefficient, to increase or decrease, the increase or decrease of the fourth coefficient resulting in an absolute value of the third coefficient being increased or decreased.

18. An electronic device comprising:
    a transmission equalizer configured to perform a pre-equalization on one or more first signals based on a first coefficient to generate one or more second signals;
    a reception equalizer configured to perform an equalization on the one or more second signals based on a second coefficient, the second coefficient being adjusted based on the one or more second signals received through a communication channel; and
    first circuitry configured to iteratively perform,
        generating control information based on the second coefficient, and
        sending the control information to the transmission equalizer, the control information causing the first coefficient to be increased or decreased,
    wherein, following a final iteration, a final absolute value of the second coefficient is decreased with respect to an initial absolute value of the second coefficient.

19. The electronic device of claim 18, wherein the first circuitry is configured to:
    control the transmission equalizer such that the first coefficient is adjusted based on the control information.

20. The electronic device of claim 19, wherein
    the control information includes
        a first indication of a particular coefficient which is to be adjusted among a plurality of transmission coefficients associated with one or more characteristics of the transmission equalizer, and
        a second indication of whether the particular coefficient is to be increased or decreased; and
    the electronic device further comprises:
        second circuitry is configured to,
            select the particular coefficient among the plurality of transmission coefficients based on the first indication, and
            increase or decrease the particular coefficient based on the second indication.

* * * * *